United States Patent [19]
Suzuki et al.

[11] Patent Number: 5,764,412
[45] Date of Patent: Jun. 9, 1998

[54] POLARIZATION SEPARATION/ CONVERSION DEVICE FOR POLARIZED LIGHTING APPARATUS AND PROJECTION DISPLAY UNIT

[75] Inventors: Toshihiro Suzuki; Hisashi Yamaguchi; Tetsuya Hamada; Mari Sugawara; Keiji Hayashi; Tetsuya Kobayashi; Takeshi Gotoh, all of Kawasaki, Japan

[73] Assignee: Fujitsu Limited, Kawasaki, Japan

[21] Appl. No.: 543,607

[22] Filed: Oct. 16, 1995

[30] Foreign Application Priority Data

Oct. 15, 1994 [JP] Japan .................... 6-275632

[51] Int. Cl.⁶ .................................... G02B 5/30
[52] U.S. Cl. ............... 359/487; 359/359; 359/361; 359/500; 349/5; 353/20; 362/19
[58] Field of Search ................. 359/487, 496, 359/498, 502, 359, 361, 590, 500, 585; 362/19; 349/5, 96, 104, 105; 353/20, 55

[56] References Cited

U.S. PATENT DOCUMENTS

| 2,748,659 | 6/1956 | Geffcken | 359/487 |
|---|---|---|---|
| 2,821,114 | 1/1958 | Wiemer | 359/495 |
| 3,743,380 | 7/1973 | Fugitt | 359/487 |
| 5,283,600 | 2/1994 | Imai | 353/20 |
| 5,381,278 | 1/1995 | Shingaki et al. | 353/20 |

FOREIGN PATENT DOCUMENTS

| A 58-78107 | 5/1983 | Japan | 359/361 |
|---|---|---|---|
| A 64-28617 | 1/1989 | Japan | 349/6 |
| A 1-246508 | 10/1989 | Japan | 359/590 |
| A 4-133004 | 5/1992 | Japan | 359/359 |
| 522734 | 1/1993 | Japan | H04N 9/31 |
| 572417 | 3/1993 | Japan | G02B 5/30 |
| 583662 | 4/1993 | Japan | H04N 5/74 |
| 5181135 | 7/1993 | Japan | G02F 1/1335 |

Primary Examiner—Paul M. Dzierzynski
Assistant Examiner—John Juba, Jr.
Attorney, Agent, or Firm—Greer, Burns & Crain, Ltd.

[57] ABSTRACT

Columnar prisms 22 to 24, cross sections of which are parallelograms, are arranged symmetrically on both sides of a columnar prism 21 whose cross section is an isosceles right triangle. The prisms are bonded to their adjacent prisms at polarization separation films D1 to D3 which are dielectric multilayer films. A reflective films is applied on the outermost surface of the outside prism 24. The polarization separation films D1 and D3, which are located in odd-numbered order from the prism 21, transmit incident p-polarized light and reflect incident s-polarized light, the polarization separation film D2 located in even numbered order from the prism 21 transmits the incident s-polarized light and reflects the incident p-polarized light. In order to achieve uniform polarization at the emission surface of a polarization separation/conversion device 20, a ½ wave plate C2 is applied on to the emission surfaces of the prisms 22 and 23. The advantages can be achieved in a structure in which the polarization separation film D2 is replaced by a reflective film.

23 Claims, 16 Drawing Sheets

POLARIZATION SEPARATION/CONVERSION DEVICE FOR POLARIZED LIGHTING APPARATUS AND PROJECTION DISPLAY UNIT

BACKGROUND OF THE INVENTION

The present invention relates to polarization separation/conversion device, a polarized lighting apparatus using the device and a projection display unit using the apparatus.

A projection display unit projects the display of a lquid crystal light valve whose diagonal measurement is a few inches into a screen by enlarging 10 to 100 times It requires a high power lamp for its light source to ensure that the projected image is bright. However, the relationship between the quantity of heat generated by the lamp and the required air cooling capacity restricts the lamp power to a maximum of approximately 250 W. While the lamp output is unpolarized, the liquid crystal light valve uses only its Linear polarized component, wasting more than 50% of the lamp's output.

To solve this problem, a polarized lighting apparatus, as shown in FIG 14A, has been disclosed (Japanese Patent Application First Publication No. 59-127019).

A light source 10 is constituted with a white lamp 11 and a reflector 12. A polarization separation/conversion device 20X is provided in front of the light source 10. Unpolarized light L1 from the light source 10 is separated into transmitted p-polarized light P1 and reflected s-polarized light S1 at a polarization separation film D1, provided between a prism 21H and a prism 22. The s-polarized light S1, after being reflected off a reflective film M2, passes through a polarizing conversion plate C1 to become p-polarized light P2. With this polarized lighting apparatus, since the linear polarized light P1 and linear polarized light P2 are effectively utilized by the liquid crystal light valve, the illuminance on the screen is approximately doubled.

However, since the thickness of the prisms must be equal to the width W of the front surface of the light source 10, for instance 48 mm, the polarization separation/conversion device 20X must be large and heavy.

To solve this problem, as shown in FIG. 16A, a polarization separation/conversion device 20Y, which is symmetrical on a plane that passes through the optical axis and is perpendicular to the surface of the paper, has been disclosed. The thickness of the polarization separation/conversion device 20Y is thus reduced to half that of the polarization separation/conversion device 20X.

The polarization separation/conversion device 20X in the polarized lighting apparatus shown in FIG. 14 can be further reduced in this thickness by adding a set of lenses to the configuration, consisting of a cylindrical convex lens for converging the incident light flux to reduce its width by half and a cylindrical concave lens for reverting the light to a parallel light, between the polarization separation/conversion device 20X and the light source 10, and by providing a plurality of sets of this configuration of two lenses aligned with the polarization separation/conversion device 20X (Japanese Patent Application First Publication No. 5-72417).

However, in this polarized lighting apparatus, since the cylindrical convex lens and the cylindrical concave lens are provided between the polarization separation/conversion device 20X and the light source 10, the entire polarized lighting apparatus becomes large, although the polarization separation/conversion device 20X itself is made thinner. In addition, since the angle of non parallel light from the light source 10 relative to the optical axis becomes larger by these cylindrical lenses, the polarizing separation factor and the polarizing conversion factor of the polarization separation/conversion device 20X is reduced, which, in turn, reduces the efficiency with which the light from the light source is utilized. Moreover, the distance between the light source 10 and the liquid crystal light valve increases because of the cylindrical lenses, and the efficiency with which the light from the light source is utilized is further reduced.

INVESTIGATION BY THE PRESENT INVENTORS

Next, by deliberating upon how a change in the distribution of illuminance when using the polarization separation/conversion device 20X affects a projection display unit, the nature of a desirable illuminance distribution is clarified.

The illuminance distribution at the front surface of the light source 10 shows a gaussian type pattern, as indicated by LXA in FIG. 14B. As illustrated in FIG. 14A, the optical axis area A where the illuminance is relatively high and the area B toward the outside, where the illuminance is relatively low, are considered separately. The emission surface of the polarization separation/conversion device 20X is divided as shown in the figure in correspondence to these areas A and B. This facilitates understanding of the outline of the illuminance distribution at the emission surface of the polarization separation/conversion device 20X. To give a more detailed account of this, the illuminance LXB at the emission surface of the polarization separation/conversion device 20X, relative to the illuminance LXA immediately in front of the light source 10 is as shown in FIG. 14B.

FIG. 15 shows a schematic structure of a projection display unit that employs the polarized lighting apparatus shown in FIG. 14A.

The linear polarized light from the emission surface of the polarization separation/conversion device 20X passes through a liquid crystal light valve 41 and a projecting lens 42, and is projected on a screen 43. The light flux that has been emitted from the area whose width is L on the emission surface of the polarization separation/conversion device 20X, after passing through point P on the liquid crystal light valve 41, passes through the projecting lens 42 and converges at the point Q on the screen 43. A convex lens 44, which is provided at the liquid crystal light valve 41 toward the polarization separation/conversion device 20X, bends the light that passes through the side portion of the liquid crystal light valve 41 so that it passes through the projecting lens 42.

By determining the average value of the illuminance over the width L on the emission surface of the polarization separation/conversion device 20X, and then by determining a hypothetical averaged illuminance ALXB, whose illuminance at the point R, the middle point of the width L, is that average value, the characteristics of the illuminance distribution on the screen 43 can be ascertained, assuming that the transmittance distribution of the liquid crystal light valve 41 is constant. The averaged illuminance ALXB when L=W is indicated with a dotted line in FIG. 14B. FIG. 16B is a similar illuminance distribution diagram for the polarization separation/conversion device 20Y.

Although steps are present in the illuminance curve LXB, by averaging over the width L, these steps, or difference in level of illuminance, are eliminated. An image projected on the screen 43 is clearer, in the condition of a uniform projection, when changes in the level of illuminance are small and the image is uniformly bright at the central area where the visual focus tends to be located. In order to uniformly brighten the central portion, the width L must satisfy a certain minimum dimension. The width L must also be made large enough to suppress differences in illuminance level. In order to increase the width L, the diameter of the projecting lens 42 must be increased. However, this will result in blurring of the image on the screen 43, lowering the quality of the display. Thus, the degree to which the diameter of the projecting lens 42 can be increased is restricted.

In order to eliminate drastic variations of illuminance in the averaged illuminance ALXB while keeping the width L small, the variation of illuminance at the steps in LXB should be kept as small as possible.

The image obtained on the screen 43 by the projection display unit shown in FIG. 15 is monochromatic. However, by separating the emitted light from the polarization separation/conversion device 20X into the three primary color lights, passing each color light through a liquid crystal light valve and superimposing them, a color image can be achieved. In this case, if variations in the illuminance distribution on the screen 43 are large and if the distance on the screen between varying the levels of illumination is short, color inconsistency due to misalignment in the superposition of the three colors on the screen 43 becomes more noticeable, reducing the quality of the display. In order to prevent this, the distance between steps in the illuminance distribution on the emission surface must be reduced and the magnitude of these steps must be reduced. Color inconsistency may also be prevented by ensuring that illuminance differences are small and are present only in the peripheral area.

SUMMARY OF THE INVENTION

Accordingly, a first object of the present invention is to provide a thinner polarization separation/conversion device, a polarized lighting apparatus and a projector display unit that employ this polarization separation/conversion device.

Another object of the present invention is to provide a polarization separation/conversion device that achieves an improvement in the quality of display in a projection display unit and a polarized lighting apparatus that employs this polarization separation/conversion device.

According to the 1st aspect of the present invention, there is provided a polarization separation/conversion device comprising: first polarization separation means for separating incident light into transmitted light and reflected light at a first plane in such a manner that the transmitted light is a first linear polarized light and the reflected light is a second linear polarized light, polarization planes of the first and second linear polarized lights being at an approximately right angle to each other; second polarization separation means for separating incident light into transmitted light and reflected light at a second plane, which is approximately parallel to the first plane, in such a manner that the transmitted light is the second linear polarized light and the reflected light is the first linear polarized light; and polarization conversion means for converting one of the first and second linear polarized light to the other of the first and second linear polarized light; wherein the first and second polarization separation means are arranged alternately in a row which direction is perpendicular to an optical axis of the polarization separation/conversion device, and the polarization conversion means is arranged in such a manner that light from the first and second polarization separation means include one of the first and second linear polarized light.

With the 1st aspect of the present invention, since the distance between the polarization separation means is reduced compared to that between the polarization separation means and the reflection means in the prior art, the polarization separation/conversion device can be made thinner to a degree proportionate to this reduction, achieving miniaturization Or the polarization separation/conversion device and a concomitant reduction in weight. This, in turn, contributes to miniaturization and weight reduction of a polarized lighting apparatus and a projection display unit using this polarization separation/conversion device. In addition, the polarization separation/conversion device made thinner in this manner makes it possible to reduce the length of the path between the light source and the light valve in a projection display unit, achieving an improvement in illuminance at the light-receiving surface of the light valve and a brighter image. This means that the power of the light source can be reduced.

These advantages can also be get by below-described second to sixth inventions.

In the 1st mode of the 1st aspect of the present invention, the polarization separation/conversion device further comprises: reflection means, for reflecting incident light at a third plane which is approximately parallel to the first plane, being arranged at one side of the row of said first and second polarization separation means.

With the 1st mode of the 1st aspect or the present invention, the light from the outer polarization separation means toward the direction perpendicular to the optical axis is utilized by the reflection means.

In the 2nd mode of the 1st aspect of the present invention, a pair of the first polarization separation means, second polarization separation means, the reflection means and the polarization conversion means are included, and one and the other of the pair are arranged symmetrically to each other in regard to a plane of symmetry.

With the 2nd mode of the 1st aspect of the present invention, since the polarization separation/conversion device is symmetrical, the illuminance distribution on a emission surface of the polarization separation/conversion device become symmetrical and it is possible to utilize the light from the light source more effectively.

In the 3rd mode of the 1st aspect of the present invention, each of the first and second polarization separation means includes: a first prism; a dielectric multilayer film formed on a surface of the first prism; and a second prism, a surface of the second prism being bonded to the dielectric multilayer film; wherein adjacent polarization separation means share one of the first and second prisms.

In the 4th mode of the 1st aspect of the present invention, one of the first and second prisms at the plane of symmetry is a first columnar prism whose cross section is an isosceles right triangle with side length of $\alpha$ and $2^{1/2}\alpha$, any other one of the first and second prisms is a second columnar prism whose cross section is a parallelogram with an inside angle of $45°$ and with two side lengths of $\alpha$ and $\alpha/2^{1/2}$, the surfaces of the first and second prism have a side of length $\alpha$.

With the 4th mode of the 1st aspect of the present invention, since the number of prisms is minimized, the polarization separation/conversion device become simple structure.

In the 5th mode of the 1st aspect of the present invention, the reflection means is constructed by a total reflection surface of the second columnar prism or reflection film formed on a surface of the second columnar prism.

According to the 2nd aspect or the present invention, there is provided a polarization separation/conversion device comprising: first polarization separation means for separating incident light into transmitted light and reflected light at a first plane in such a manner that the transmitted light is a first linear polarized light and the reflected light is a second linear polarized light, polarization planes of the first and second linear polarized lights being at an approximately right angle to each other; second polarization separation means for separating incident light into transmitted light and reflected light at a second plane, which is approximately parallel to the first plane, in such a manner that the transmitted light is the second linear polarized light and the reflected light is the first linear polarized light; reflection means for reflecting incident light at a third plane which is approximately parallel to the first plane; and polarization conversion means for converting one of the first and second linear polarized light to the other of the first and second linear polarized light; wherein the first and second polarization separation means are arranged alternately in a first row which direction is perpendicular to an optical axis of the polarization separation/conversion device, the reflection means is arranged at one side of the first row, and the first row of the first polarization separation means, the second polarization separation means and the reflection means constitute a first stage, the reflection means of inside, one of the first and second polarization separation means and the reflection means are arranged in this order in a second row which direction is parallel to the first row, and the second row of the two reflection means and the one of the first and second polarization separation means constitute a second stage, the first and second stage is arranged in such a manner that incident light parallel to the optical axis comes to the reflection mean of inside of the second stage, which prevents the incident light parallel to the optical axis coming to polarization separation means adjacent to the reflection means of the first stage, the polarization conversion means is arranged in such a manner that light from the first and second stage include one of the first and second linear polarized light.

With the 2nd aspect of the present invention, since the mixing of the first and second liner polarized light can be reduced, it is possible to utilize the light from the light source more effectively.

According to the 3rd aspect of the present invention, there is provided a polarization separation/conversion device comprising: polarization separation means for separating incident light into transmitted light and reflected light at a first plane in such a manner that the transmitted light is one of first and second linear polarized light and the reflected light is the other of the first and second linear polarized light, the first and second linear polarized light being at an approximately right angle to each other; reflection means, for reflecting incident light at a second plane which is approximately parallel to the first plane; and polarization conversion means for converting one of the First and second linear polarized light to the other of the first and second linear polarized light; wherein the polarization separation means, the reflection means, the polarization separation means and the reflection means are arranged in this order in a row which direction is perpepndicular to an optical axis of the polarization separation/conversion device, the polarization conversion means is arranged in such a manner that light from the two polarization separation means and the two reflection means include one of the first and second linear polarized light.

With the 3rd aspect of the present invention, the distance between steps in the illuminance distribution at the central portion of the emission surface of the polarization separation/conversion device is reduced to approximately half that in the structure in which the reflection means is replaced by polarization separation means, the averaged illuminance distribution becomes more flat at the central portion. As a result, by configuring a polarized lighting apparatus using this polarization separation/conversion device and using this polarized lighting apparatus to constitute a projection display unit, the resolution of the projected images on the screen can be improved compared to the configuration in which the replacement is made, achieving a reduction in color inconsistency, and a bright, comfortable image at the center of the screen. As a result, the display quality of the projection display unit is improved.

Furthermore, since, generally speaking, reflection means has a simpler structure than polarization separation means, with the former having a higher reflection factor than polarization separation means, the former is preferable.

In the 1st mode of the 3rd aspect of the present invention, a pair of the two polarization separation means, the two reflection means and the polarization conversion means is included, and one and the other of the pair are arranged symmetrically to each other In regard to a plane of symmetry.

In the 2nd mode of the 3rd aspect of the present invention, each of the polarization separation means includes: a first prism; a dielectric multilayer film formed on a surface of the first prism; and a second prism, a surface of the second prism being bonded to the dielectric multilayer film.

In the 3rd mode of the 3rd aspect of the present invention, one of the first and second prisms at the plane of symmetry is a first columnar prism whose cross section is an isosceles right triangle with side length of $\alpha$ and $2^{1/2}\alpha$, any other one of the first and second prisms is a second columnar prism whose cross section is a parallelogram with an inside angle of 45° and with two side lengths of $\alpha$ and $\alpha/2^{1/2}$ the surfaces of the first and second prism have a side of length $\alpha$.

In the 4th mode of the 3rd aspect of the present invention, the reflection means is constructed by a total reflection surface of the second columnar prism or reflection film formed on a surface of the second columnar prism.

According to the 4th aspect of the present invention, there is provided a polarization separation/conversion device comprising: polarization separation means for separating incident light into transmitted light and reflected light at a first plane in such a manner that the transmitted light is one of first and second linear polarized light and the reflected light is the other of the first and second linear polarized light, the first and second linear polarized light being at an approximately right angle to each other; reflection means, for reflecting incident light at a second plane which is approximately parallel to the first plane; and polarization conversion means for converting one of the first and second linear polarized light to the other of the first and second linear polarized light; wherein the polarization separation means, the reflection means, the polarization separation means and the reflection means of outside are arranged in this order in a first row which direction is perpendicular to an optical axis of the polarization separation/conversion device, and the first row of the two polarization separation means and the two reflection means constitute a first stage, the reflection means of inside, the polarization separation means and the reflection means are arranged in this order in a second row which direction is parallel to the first row, and the second row of the two reflection means and the polarization separation means constitute a second stage, the first and second stage is arranged in such a manner that incident light parallel to the optical axis comes to the reflection mean of inside of the second stage, which prevents the incident light parallel to the optical axis coming to polarization separation means adjacent to the reflection means of outside of the first stage, the polarization conversion means is arranged in such a manner that light from the first and second stage include one of the first and second linear polarized light.

With the 4th aspect of the present invention, since the mixing of the first and second liner polarized light can be reduced, it is possible to utilize the light from the light source more effectively.

According to the 5th aspect of the present invention, there is provided a polarization separation/conversion device comprising: polarization separation means for separating incident light into transmitted light and reflected light at a first plane in such a manner that the transmitted light is one of first and second linear polarized light and the reflected light is the other of the first and second linear polarized light, the first and second linear polarized light being at an approximately right angle to each other; reflection means, for reflecting incident light at a second plane which is approximately parallel to the first plane; and polarization conversion means for converting one of the first and second linear polarized light to the other of the first and second linear polarized light; wherein the polarization separation means, the reflection means and the reflection means are arranged in this order in a row which direction is perpendicular to an optical axis of the polarization separation/conversion device, the polarization conversion means is arranged in such a manner that light from the polarization separation means and the two reflection means include one of the first and second linear polarized light.

With the 5th aspect of the present invention, the structure of the polarization separation/conversion device become simple.

In the 1st mode of the 5th aspect of the present invention, a pair of the polarization separation means, the two reflection means and the polarization conversion means is included, and one and the other of the pair are arranged symmetrically to each other in regard to a plane of symmetry.

According to the 6th aspect of the present invention, there is provided a polarization separation/conversion device comprising: polarization separation means for separating incident light into transmitted light and reflected light at a first plane in such a manner that the transmitted light is a first linear polarized light and the reflected light is a second linear polarized light, the first and second linear polarized light being at an approximately right angle to each other; reflection means, for reflecting incident light at a second plane which is approximately parallel to the first plane; and polarization conversion means for converting one of the first and second linear polarized light to the other of the first and second linear polarized light; wherein the polarization separation means includes: a First columnar prism whose cross section is a trapezoid with a length $\alpha$ of diagonal sides facing opposite each other and with a inside angle of approximately 45°; a second columnar prism whose cross section is a parallelogram with lengths of approximately $\alpha$ and $\alpha/2^{1/2}$ and with a inside angle of approximately 45°; and a dielectric multilayer film formed between a diagonal surface of the first columnar prism and a surface of the second columnar prism, both shape of the surfaces being approximately identical; the reflection means is formed at the second columnar prism on a surface opposite to the dielectric multilayer film, the polarization conversion means is arranged in such a manner that light from the polarization separation means and the reflection means include one of the first and second linear polarized light, the polarization separation/conversion device is constructed symmetrically in regard to a plane of symmetry of the first columnar prism, the plane of symmetry including a longitudinal cross section.

With the 6th aspect of the present invention, although the light passing through the central portion of the polarization separation/conversion device is not polarized and there is a waste, since the steps in the illuminance distribution on the emission surface of the polarization separation/conversion device are only present at both ends, the averaged illuminance distribution does not have the depressed area near the optical axis and an even comfortable image is achieved by increasing the power of the light source.

According to the 7th aspect of the present invention, there is provided a projection display unit comprising: a light source a polarization separation/conversion device for separating incident light from the light source into first and second linear polarized light and converting said second linear polarized light into said First linear polarized light, the first and second linear polarized light being at an approximately right angle to each other; UV & IR cut-off filter arranged in a light path between the light source and the polarization separation/conversion device; a light valve for changing linear polarized light transmittance in response to an image input signal, light from the polarization separation/conversion device being entered into the light valve; and a projecting lens for projecting light from the light valve on to a screen; wherein the UV & IR cut-off filter comprising: a glass plate containing a substance that absorbs ultraviolet light in wavelengths of approximately 350 nm or less, an ultraviolet cut-off filter, constituted by forming a dielectric multilayer film on a surface of the glass plate, being arranged to the light source side; and an infrared cutoff filter constituted by forming a dielectric multilayer film on a surface of the glass plate opposite to the surface on which the ultraviolet cut-off filter is formed; wherein the glass plate having a thickness that allows for the glass plate to have an ultraviolet light cutoff factor greater than that of the ultraviolet cutoff filter.

The ultraviolet light cutoff factor in the dielectric multilayer film cannot be increased in proportion to its thickness, while there is an advantage to the glass plate in that its ultraviolet light cut-off factor increases in proportion to its thickness. The glass plate absorbs ultraviolet light and generates heat, while there is an advantage to the ultraviolet light cutoff filter of the dielectric multilayer film in that it absorbs almost no ultraviolet light.

With the 7th aspect of the present invention, by first removing most of the entering ultraviolet light with the ultraviolet light cutoff filter and then further blocking the ultraviolet light with the glass plate whose ultraviolet cut-off factor is even higher, the shortcomings of both the ultraviolet cut-off filter and the glass plate for blocking ultraviolet light are overcomes, since they are each compensated for by the strong points of the other. This makes it possible to reduce the heat generated by the ultraviolet light absorbed in the UV and IR cut-off filter and to prevent degradation of optical adhesive used in the polarization separation/conversion device, even when the polarization separation/conversion device is positioned near the light source. Consequently, when this polarized lighting apparatus is employed in a projection display unit, it is not necessary to provide a polarization separation/conversion device in the light path of each of the three primary colors, and this contributes to simplification of the structure of the projection display unit, reduction in the cost, miniaturization and weight reduction.

DESCRIPTION OF THE PREFERRED EMBODIMENTS

The polarization separation/conversion device in each embodiment has a structure that has a plane of symmetry passing through the optical axis, and is perpendicular to the surface of the paper. The structure and functions on one side of this plane of symmetry are explained here.

Figure 14A:
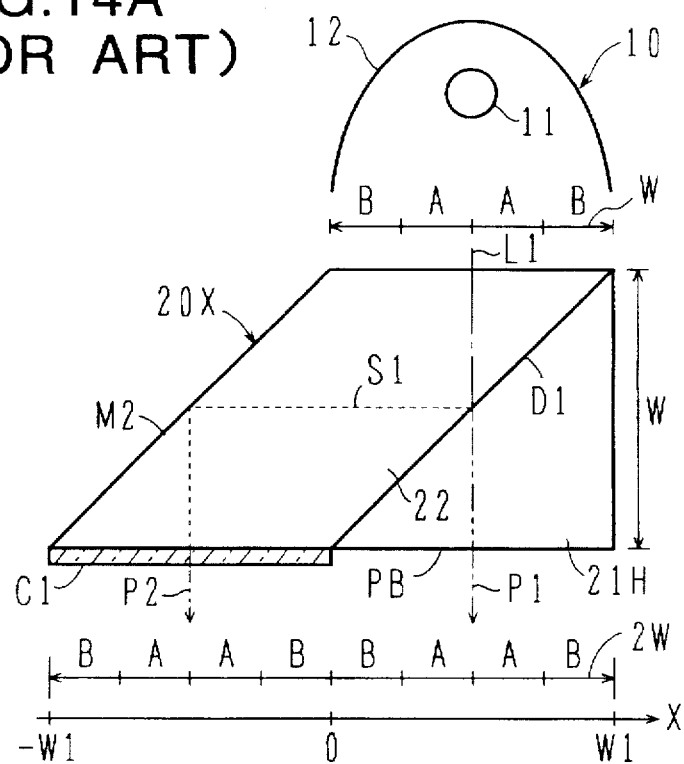
FIG. 14A is a schematic view of a polarized lighting apparatus in the prior art.

The divided areas A to C in the figures represent the same concept as that shown in FIG. 14A and facilitate understanding of the illuminance distribution on the emission surface of the polarization separation/conversion device, based upon the distribution of the divided areas A to C on the emission surface.

Figure 14B:
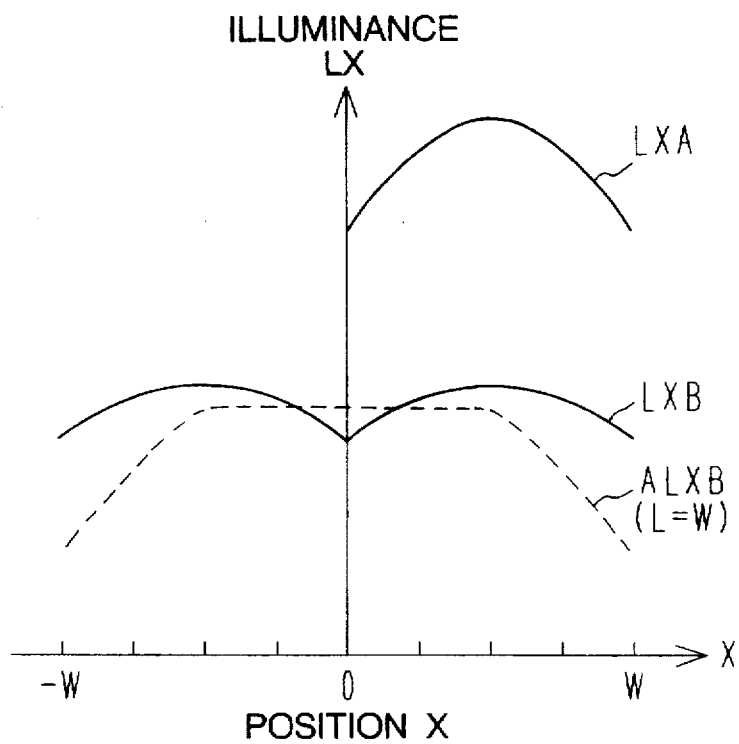
FIG. 14B is a diagrammatic view of non-averaged and averaged illuminance distribution on a emission surface of a polarization separation/conversion device in the prior art.
Figure 15:
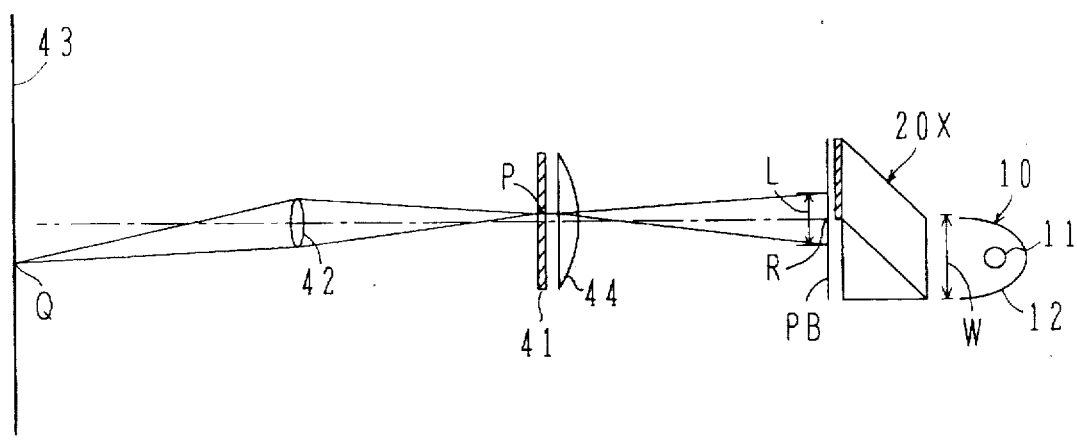
FIG. 15 is a schematic view of a prior art projection display unit that employs the polarized lighting apparatus shown in FIG. 14A.

The diagrams shown in FIGS. 1B, 3B, 4B, 6B, 7B, 8B and 10B show the illuminance LXB and the averaged illuminance ALXB, which correspond to those shown in FIG. 14B, on the emission surfaces of the polarization separation/conversion devices shown in FIGS. 1A, 3A, 4A, 6A, 7A, 8A and 10A respectively.

Also, the light source 10 shown in all the figures has an identical structure and the width of its front surface is expressed as W.

First Embodiment

A polarization separation/conversion device 20A is provided with prisms 22, 23 and 24 parallel to one another on one of the inclined surfaces of a prism 21, located at the center. The prisms 21 to 24 are all columnar, extending in the perpendicular direction relative to the surface of the paper. The prisms are formed of glass or plastic.

The cross section of the prism 21 is an isosceles right triangle with the length of the side opposite to the vertex at W/2. The cross sections of the prisms 22 to 24 are parallelograms and are identical to each other with the acute inside angles at 45° and the lengths of the two sides enclosing this angle at W/4, and $2^{1/2}W/4$. Consequently, the thickness of the polarization separation/conversion device 20A is W/4 while the width of its emission surface is 2W.

The prisms 21 and 22 are bonded at a polarization separation film D1. The polarization separation film D1 is a dielectric multilayer film with, for instance, 20 to 30 layers. The surface of this film and the inclined surface of the prism 22 are bonded with an optical adhesive, for instance, after the dielectric multilayer film is applied on to the inclined surface of the prism 21. Likewise, the prisms 22 and 23 are bonded at a polarization separation film D2 and the prisms 23 and 24 are bonded at a polarization separation film D3.

Among the polarization separation films D1 to D3, the polarization separation characteristics of adjacent films are reversed. In other words, the polarization separation films D1 and D3, which are notated with odd numbers counting from the plane of symmetry, cause incident p-polarized light to be transmitted and incident s-polarized light to be reflected. In contrast, the polarization separation film D2, notated with an even number counting from the plane of symmetry, causes the incident p-polarized light to be reflected and the incident s-polarized light to be transmitted.

A polarization separator is constituted with the polarizing separation film D1 and the prisms on both sides of the film, another polarization separator is constituted with the polarizing separation film D2 and the prisms on both sides of the film and yet another polarization separator is constituted with the polarizing separation film D3 and the prisms on both sides of the film.

A reflective film M4 is applied on to the surface of the prism 24 that is the farthest away from the plane of symmetry of the polarization separation/conversion device 20A, which faces opposite to the polarization separation film D3. The reflective film M4 is constituted with, for instance, a dielectric multilayer film, an aluminum film or a combination of both. Since the polarization separation/conversion device 20A is positioned in a location where the temperature is relatively high and also since aluminum film would become oxidized if there was any water present, reducing the reflection factor, it is preferable to use dielectric multilayer film.

A polarizing conversion plate C2 is bonded on to the emission surfaces of the prisms 22 and 23 with optical adhesive. The polarizing conversion plate C2 converts p-polarized light to s-polarized light and also converts s-polarized light to p-polarized light by rotating the polarization plane of the incident light by 90°, and is constituted with for instance, a ½ wave plate or a optical rotatory plate. The ½ wave plate may be constituted by, for instance, covering a polycarbonate which has double refraction with a protective film or by stretching a polyvinyl alcohol film to render the desired double refraction and then by enclosing it with a thin plate of protective glass. The optical rotatory plate may be, for instance, a magnetic garnet crystal plate. The thickness of the polarizing conversion plate C2 is for instance, 0.2 mm, to be small enough compared to W/4=12 mm and insignificant in relation to the thickness of the polarization separation/conversion device 20A.

In the structure described above, unpolarized light L1 which has entered the light-receiving surface of the polarizing separation conversion device 20A along a path perpendicular to the area A on the front surface of the light source 10, where the intensity of the light is relatively high, is divided into the transmitted p-polarized light P1 and the reflected s-polarized light S1 at the polarization separation film D1. The intensities of the p-polarized light P1 and the s-polarized light S1 are approximately half of that of the unpolarized light L1. The p-polarization is defined relative to the surface of the polarization separation film D1 and the direction of its electric vector oscillation is in the paper and a right angle to the direction in which the unpolarized light advances. The direction of the electric vector oscillation of the s-polarization is perpendicular to the paper. The s-polarized light S1 is transmitted through the polarization separation film D2, reflected by the polarization separation film D3 to propagate parallel to the p-polarized light P1 and then travels through the polarizing conversion plate C2 to become p-polarized light P4.

Unpolarized light T.2 which has entered the light-receiving surface of the polarizing separation/conversion device 20A along a path perpendicular to the area B on the front surface of the light source 10, which is on the outside of the area A on the front surface of the light source 10, where the intensity of the light is lower than in area A, is divided into the transmitted s-polarized light S2 and the reflected p-polarized light P5 at the polarization separation film D2. While the s-polarized light S2 passes through the polarizing conversion plate C2 to become p-polarized light P3, the p-polarized light P5 is reflected by the reflective film M4 to propagate parallel to the p-polarized light P1.

Figure 1A:
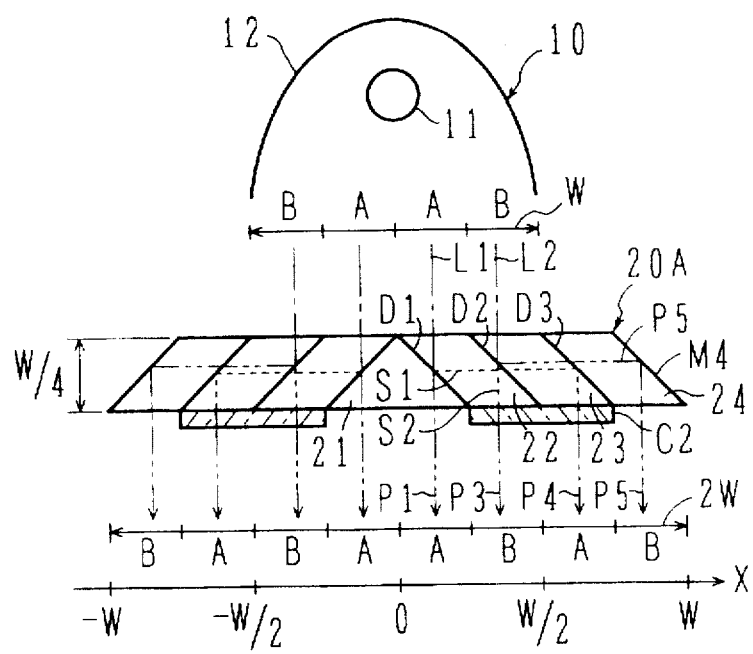
FIG. 1A is a schematic view of a polarized lighting apparatus in the first embodiment according to the present invention.
Figure 1B:
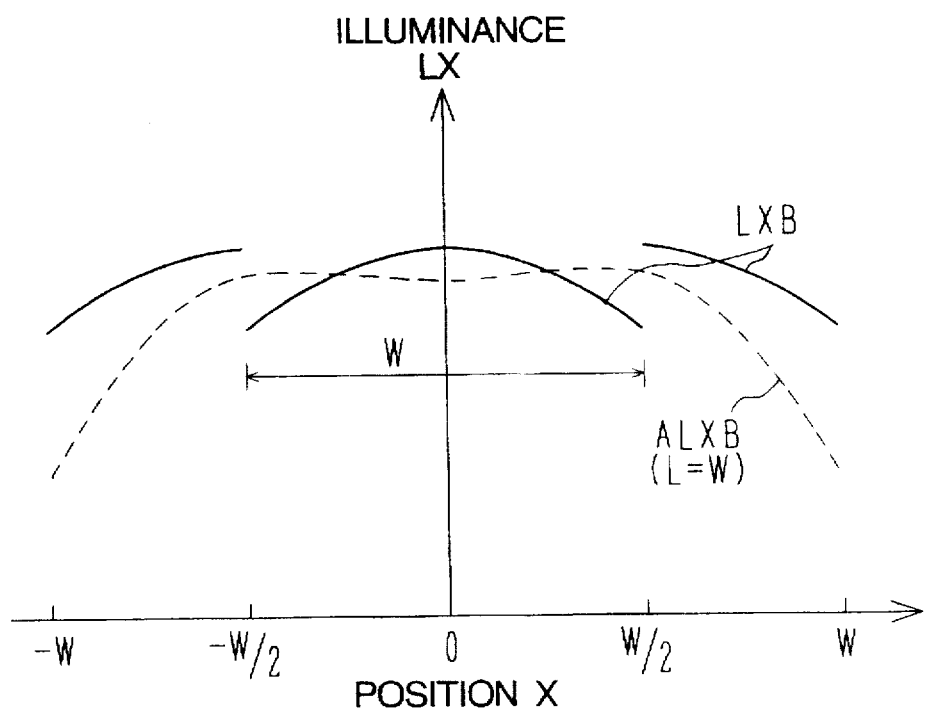
FIG. 1B is a diagrammatic view of non-averaged and averaged illuminance distribution on a emission surface of a polarization separation/conversion device.
Figure 16A:
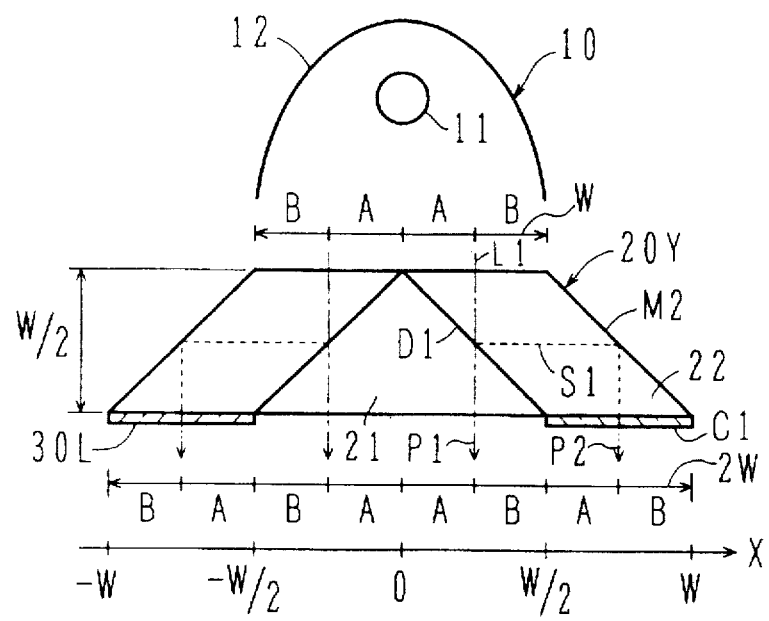
FIG. 16A is a schematic view of another polarized lighting apparatus in the prior art.
Figure 16B:
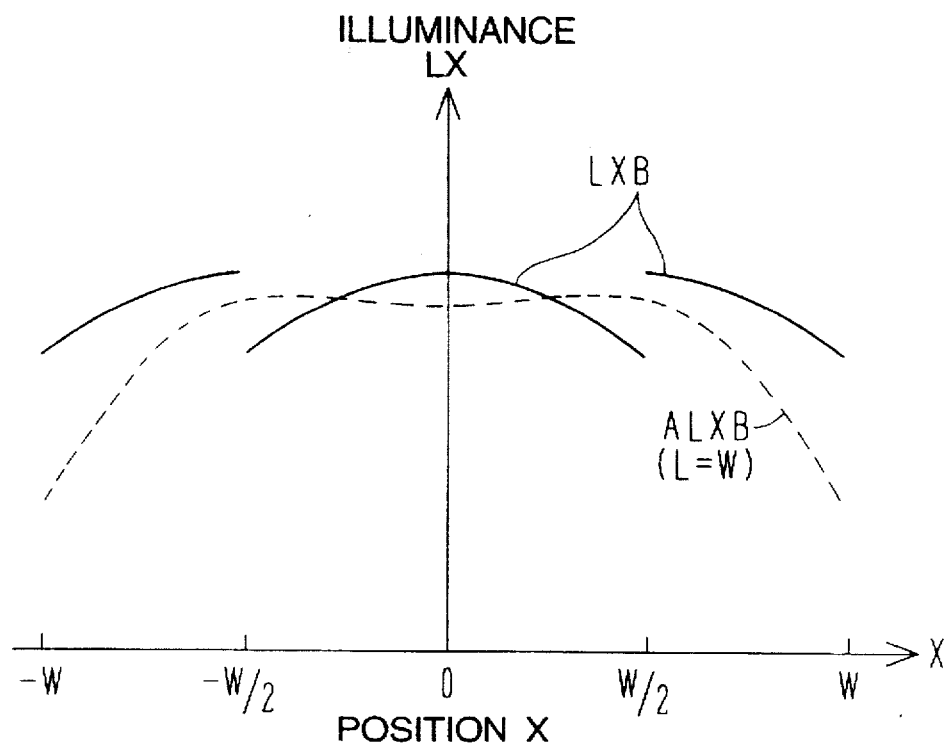
FIG. 16B is a diagrammatic view of non-averaged and averaged illuminance distribution on a emission surface of a polarization separation/conversion device in the prior art.

The illuminance LXB shown in FIG. 1B is approximately the same as the illuminance LXB shown in FIG. 16B, while the thickness W/4 of the polarization separation/conversion device 20A is reduced to half of that of the polarization separation/conversion device 20Y, greatly contributing to realizing a thinner and lighter polarization separation/conversion device.

Figure 2:
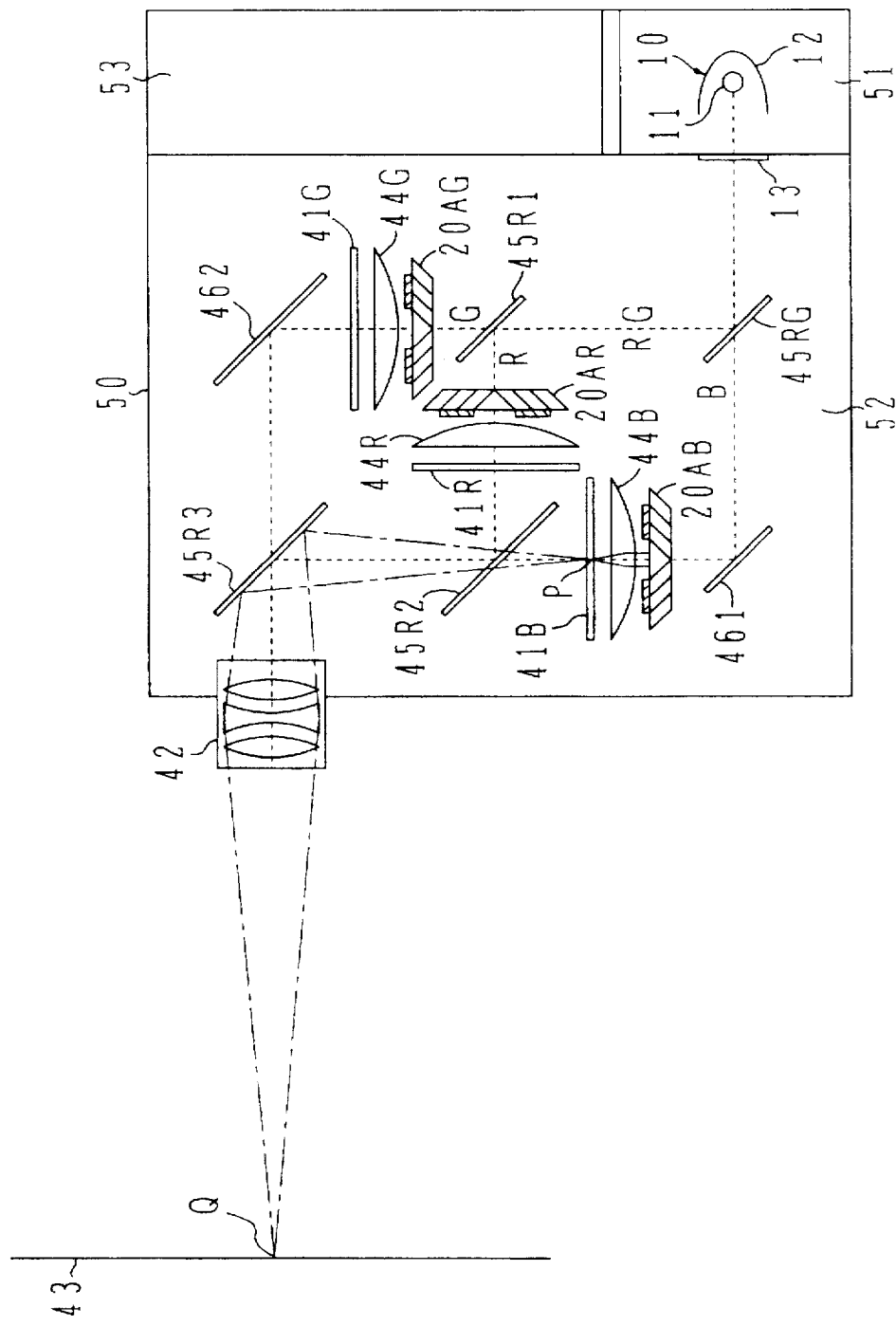
FIG. 2 is a schematic view of a projection display unit that employs the polarized lighting apparatus shown in FIG. 1A.

FIG. 2 shows a projection display unit that employs the polarization separation/conversion device shown in FIG. 1. This projection display unit has a structure as the prior art except for the polarization separation/conversion devices, arrangement of the devices and the sizes of some of the devices.

A case 50 is partitioned into a chamber 51 that houses the light source 10, a chamber 52 that houses the optical apparatus except for the light source 10 and a chamber 53 that houses electrical circuits.

Most of the ultraviolet light and infrared light are blocked by a UV & IR cutoff filter 13 which is provided in front of the light source 10. The ultraviolet transmittance of the UV & IR cut-off filter 13 is approximately 1%. However, this ultraviolet transmittance is still too much for the optical adhesive used in the polarization separation/conversion device, and the optical adhesive will become degraded by ultraviolet light, will foam and turn white to reduce the transmittance of the device. To deal with this problem, three polarization separation/conversion devices 20AB, 20AR and 20AG, which are structured identically to the polarization separation/conversion device 20A shown in FIG. 1A, are provided in the light paths of the blue light B, the red light R and the green light G respectively, i.e., at positions that are remote from the light source 10.

The visible light component of the unpolarized light from the light source 10 passes through the UV & IR cut-off filter 13 and is then separated into the red light R with the green light G and the blue light B at a dichroic mirror 45RG. The blue light B is reflected by a total reflection mirror 461 and passes through the polarization separation/conversion device 20AB, a convex lens 44B, a liquid crystal light valve 41B and a dichroic mirror 45R2 and is reflected by a dichroic mirror 45R3. The red light R with green light G 1s divided into the red light R and the green light G at a dichroic mirror 45R1. The red light R after passing through the polarization separation/conversion device 20AR, a convex lens 44R and a liquid crystal light valve 41R, is reflected by the dichroic mirrors 45R2 and 45R3. The green light G, after passing through the polarization separation/conversion device 20AG, a convex lens 44G and a liquid crystal light valve 41G, as reflected by a total reflection mirror 462 and is then transmitted through the dichroic mirror 45R3. The light that is superimposed at the dichroic mirror 45R3 is then projected on to the screen 43 by the projecting lens 42.

Since the polarization separation/conversion devices 20AB, 20AR and 20AG expand the width of the incident light flux twice, the width of the front surface of the light source 10, the dichroic mirrors 45RG and 45R1 and the total reflection mirror 462 are reduced to approximately half the corresponding measurements in the prior art.

As FIG. 2 clearly indicates, achieving a thinner, lighter polarization separation/conversion device contributes to miniaturization and weight reduction of a projection display unit. In the prior art, because of the great thickness of the polarization separation/conversion device and also because of the demand for miniaturization, it has not been possible to provide the polarization separation/conversion device toward the liquid crystal light valve. Instead the polarization separation/conversion device has been provided at a position remote from the light valve and closer to light source 10, between the UV & IR cutoff filter 13 and the dichroic mirror 45RG. Since the polarization separation/conversion device 20A in the first embodiment according to the present invention is made thinner even if it is positioned toward the liquid crystal light valve, the demand for miniaturization is satisfied.

In the projection display unit in the first embodiment according to the present invention, since polarization separation/conversion devices are provided at positions remote from the light source 10, the irradiation quantity of ultraviolet and infrared light on to the polarization separation/conversion devices is reduced. As a result, using the light source 10 with a relatively high power, a bright image can be projected on the screen 43.

The wavelength band is narrower after the three primary colors are separated. While the polarizing separation performance and the polarizing conversion performance of the polarization separation/conversion device 20A increases as the wavelength band of the incident light becomes narrower. Accordingly, the efficiency with which light is utilized in the liquid crystal light valve is improved and an even brighter projected image can be achieved, by providing the polarization separation/conversion devices in the paths after the three primary colors are separated.

Second Embodiment

The basic concept of the polarization separation/conversion device shown in FIG. 1 is that polarization separators with opposite characteristics are provided alternately, and by applying the same idea while further increasing the number of prisms, a polarized lighting apparatus can be made even thinner. FIG. 3 shows the polarized lighting apparatus in the second embodiment which employs a polarization separation/conversion device 20B with the number of prisms increased by two compared to that in FIG. 1.

The size of each prism is ⅔ of that in FIG. 1. The prism 24 and the outermost prism 25 are bonded at a polarization separation film D4. A reflective film M5 is applied on to the surface of the prism 25 that faces opposite to the polarization separation film D4. Also, a polarizing conversion plate C3 is applied on to the emission surface of the prism 25.

The paths of the unpolarized Light L1 and L2 are the same as those shown in FIG. 1. Unpolarized light L3, which enters the prism 22 perpendicular from the area C, which is located at the outermost position when the front surface of the light source 10 is divided into six equal portions, is then separated into transmitted p-polarized light P7 and reflected s-polarized light S2 at the polarization separation film D3. After being transmitted through the polarization separation film D4, the s-polarized light S2 is reflected by the reflective film M5 to propagate parallel to the p-polarized light P1 and then it passes through the polarizing conversion plate C3 to become p-polarized light P6. While the p-polarized light P7, after passing through the polarizing conversion plate C2, becomes the invalid s-polarized light S3, since the p-polarized light P4 is emitted in the same area where the s-polarized light S3 is emitted, a desirable distribution of p-polarized light is achieved.

Figure 3A:
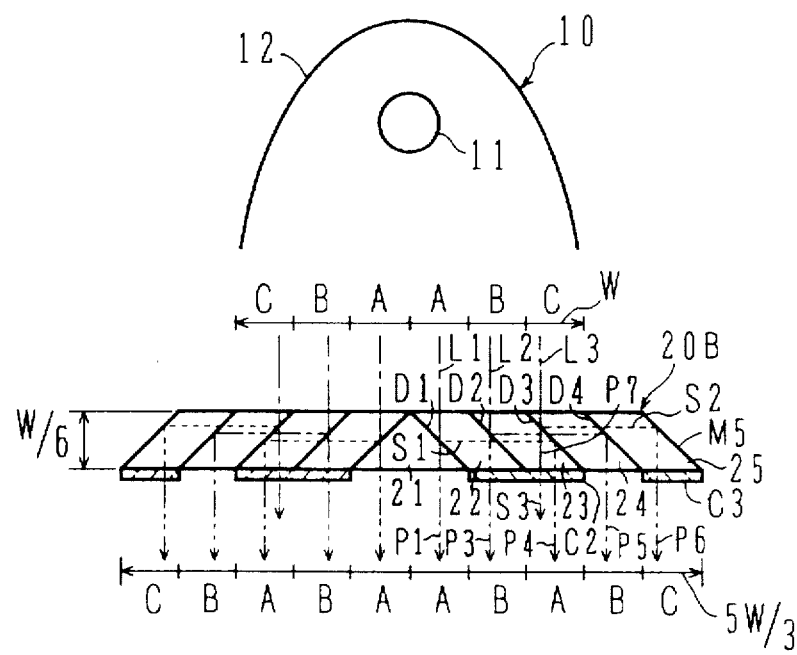
FIG. 3A is a schematic view of a polarized lighting apparatus in the second embodiment according to the present invention.
Figure 3B:
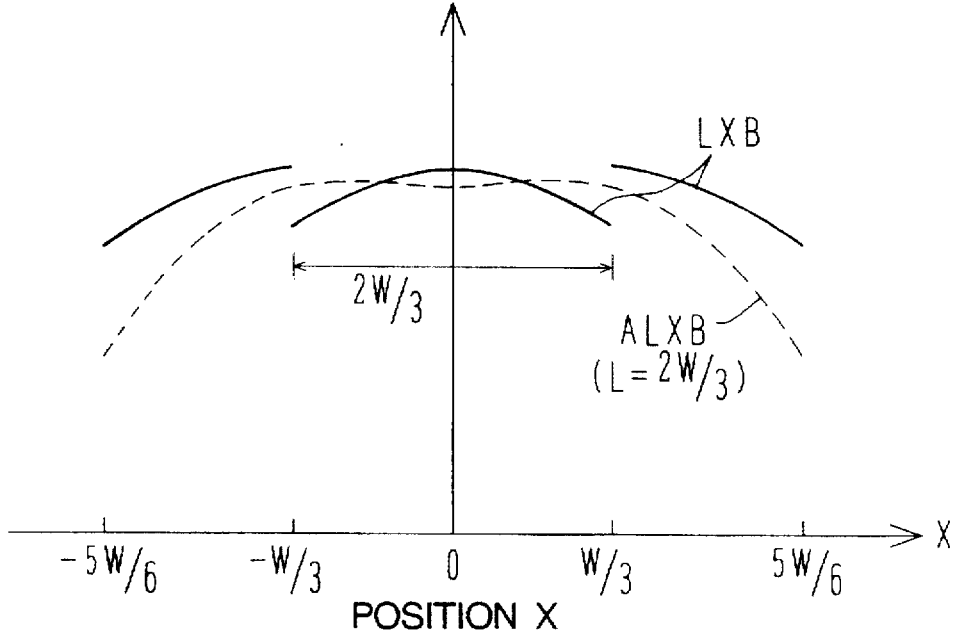
FIG. 3B is a diagrammatic view of non-averaged and averaged illuminance distribution on a emission surface of a polarization separation/conversion device.

As shown in FIG. 3B, the distance 2W/3 between steps in the illuminance LXB is ⅔ that in FIG. 1B and the magnitude of the steps are approximately the same as those in FIG. 1B. Consequently, following the theory discussed above, the width L can be reduced compared to the first embodiment, in which the polarization separation/conversion device 20A is used. With this, the resolution of projected images is improved and, in particular, the quality of display of high resolution projected images with many pixels is improved.

While the width L of the averaged illuminance ALXB in FIG. 3B is ⅔ of that shown in FIG. 1B, its form is approximately the same as that of the averaged illuminance ALXB in FIG. 1B.

Third Embodiment

While, in the second embodiment, the distance between steps in the illuminance LXB is reduced by increasing the number of polarization separators, the same effect can be achieved without increasing the number of polarization separators.

FIG. 4 shows the polarized lighting apparatus in the third embodiment.

A polarization separation/conversion device 20C has a structure in which the second polarization separation film D2 from the plane of symmetry shown in FIG. 1A is replaced by a reflective film M2 and although the difference from the polarization separation/conversion device 20A in the structure is small, a significant advantage is obtained, as explained below.

The s-polarized light S1, reflected by the polarization separation film D1, is then reflected by the reflective film M2 and passes through the polarizing conversion plate C2 to become p-polarized light P2. The unpolarized light L2 is reflected by the reflective film M2 and is then separated into the transmitted polarized light P5 and the reflected s-polarized light S4 at the polarization separation film D3. The p-polarized light P5 is reflected by the reflective film M4 to propagate parallel to the p-polarized light P1 while the s-polarized light S4 passes through the polarizing conversion plate C2 to become p-polarized light P8.

Figure 4A:
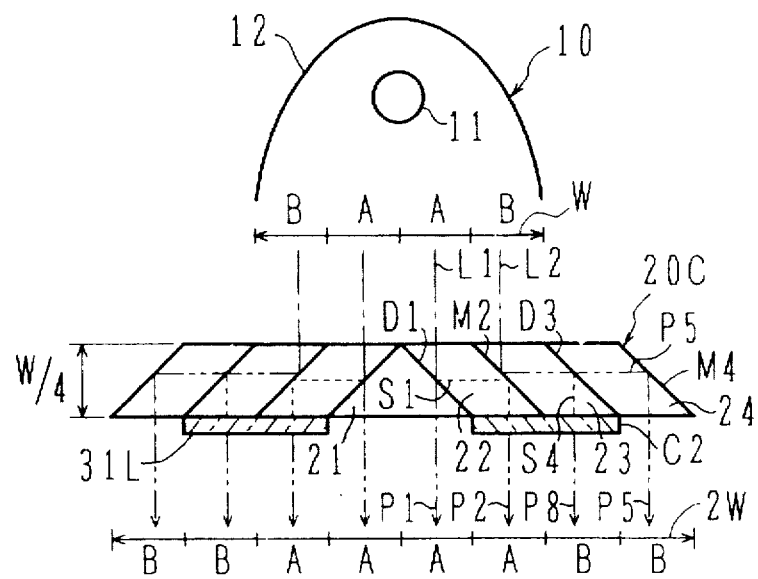
FIG. 4A is a schematic view of a polarized lighting apparatus in the third embodiment according to the present invention.
Figure 4B:
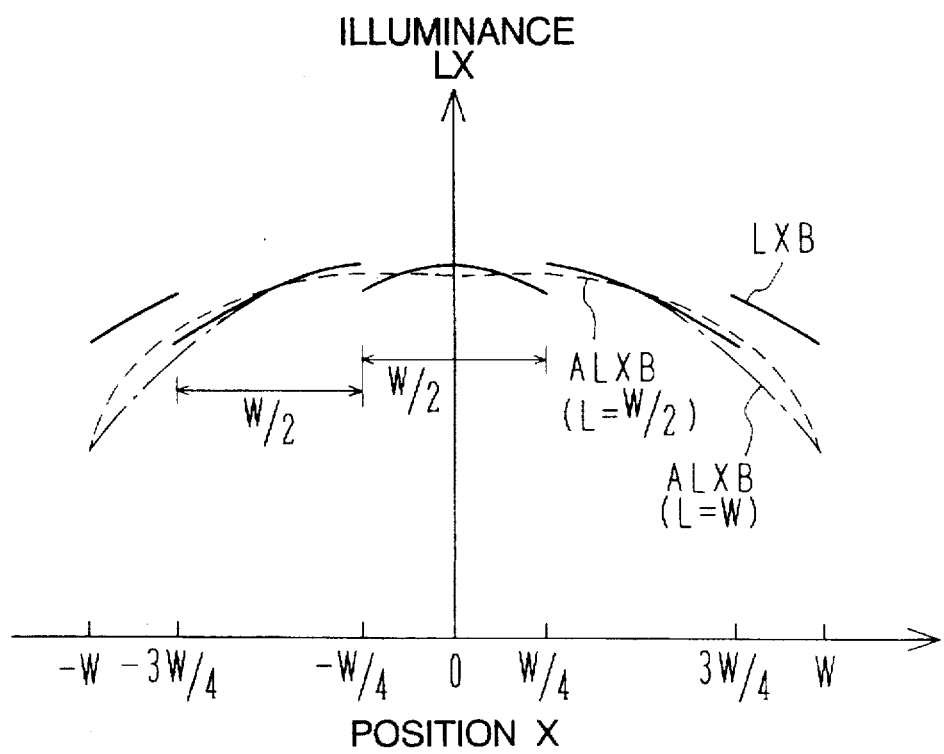
FIG. 4B is a diagrammatic view of non-averaged and averaged illuminance distribution on a emission surface of a polarization separation/conversion device.

In FIG. 4B, the illuminance LXB achieves the same form with $0 \leq X \leq W/4$ and $W/4 \leq X \leq W/2$. With this, the distance between steps in the illuminance LXB becomes W/2, which is ½ of that in FIG. 1B. Furthermore, the steps in the illuminance LXB are reduced compared to those in FIG. 1B. Accordingly, with the width L reduced to half that in FIG. 1B, the result is the averaged illuminance ALXB approaching the averaged illuminance ALXB in FIG. 1B and eliminating the depressed area at the center.

Consequently, compared to the first embodiment employing the polarization separation/conversion device 20A and the second embodiment employing the polarization separation/conversion device 20B, the width L is reduced while the resolution of images projected by the projection display unit is improved, reducing the color inconsistency described earlier and achieving a bright, comfortable image.

In addition, in the polarization separation/conversion device 20C, the number Of prisms is reduced by 2 compared to the polarization separation/conversion device 20B and the reflective film M2 has advantages in that its structure is simpler than that of the polarization separation Film D2 and its reflection factor is higher than that of the polarization separation film D2.

Generally, the polarizing separation characteristics of the polarization separation films D1 and D3 provided to the front and rear of the reflective film M2, can be selected independently of each other in design. For instance, the embodiment may have a structure in which the polarization separation film D3 is made to have reverse characteristics to those of the polarization separation film D1 and instead of providing a polarizing conversion plate on the emission surface of the prisms 23, a polarizing conversion plate is provided on the emission surface of the prism 24.

Fourth Embodiment

Figure 5:
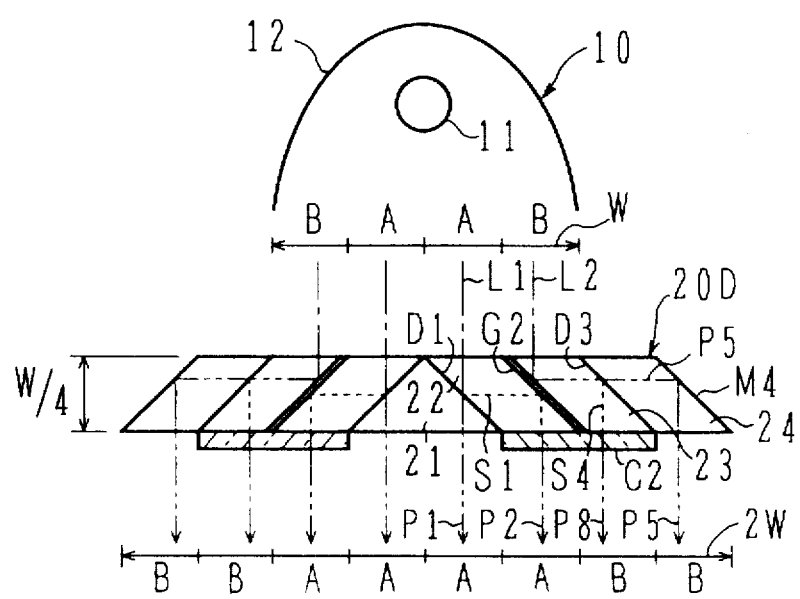
FIG. 5 is a schematic view of a polarized lighting apparatus in the fourth embodiment according to the present invention.

FIG. 5 shows the polarized lighting apparatus in the fourth embodiment.

A polarizing separation/conversion device 20D featured in this embodiment, is provided with an air gap G2, which communicates with the outer air, between the prisms 22 and 23, in place of the reflective film M2 shown in FIG. 4A. With this, the total reflection characteristics of the prisms 22 and 23 are fully utilized, to impart similar effects as those when the reflective film M2 is used, achieving the advantages of the third embodiment described above.

The air gap G2 must have sufficient span relative to the wavelength of the light, and 0.1 mm should suffice.

Since this polarizing separation conversion device 20D which employs the air gap G2, can be assembled by separately manufacturing the portions on both sides of the air gap, an improvement in yield can be achieved compared to the polarized lighting apparatus in the third embodiment.

Fifth Embodiment

Figure 6A:
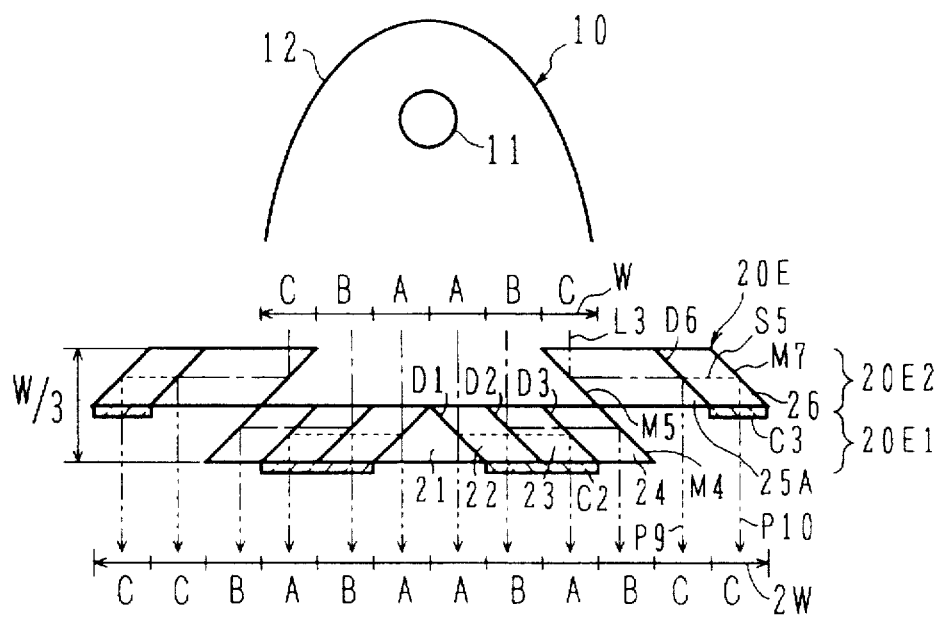
FIG. 6A is a schematic view of a polarized lighting apparatus in the fifth embodiment according to the present invention.
Figure 6B:
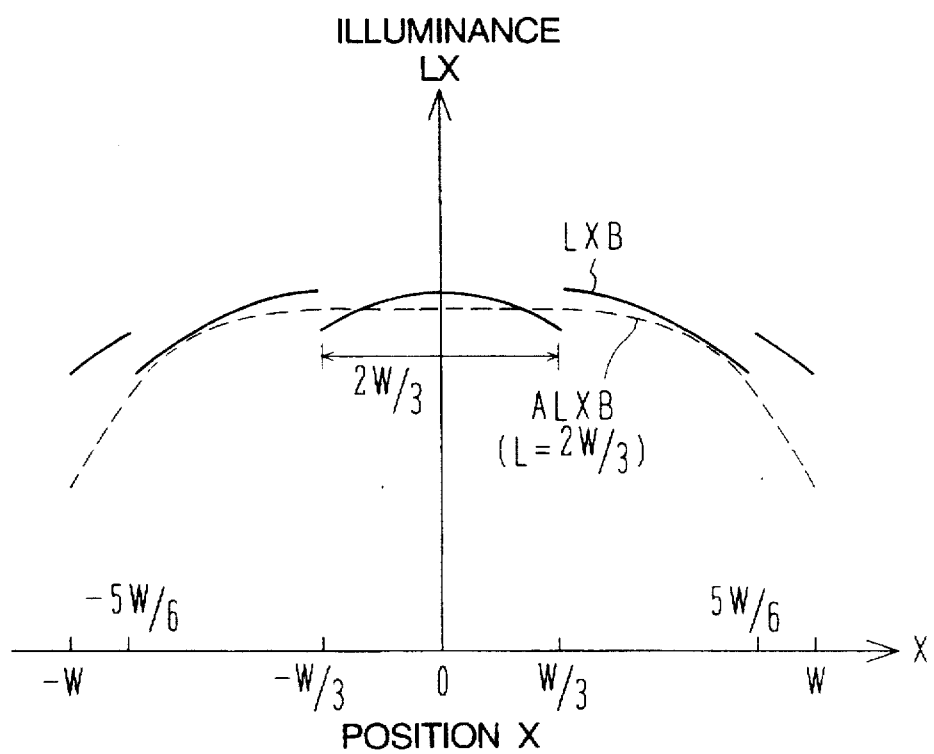
FIG. 6B is a diagrammatic view of non-averaged and averaged illuminance distribution on a emission surface of a polarization separation/conversion device.

In FIG. 3A, the s-polarized light S3 is wasted. In order to avoid such waste, in the polarized lighting apparatus in the fifth embodiment, a polarizing separation/conversion device 20E features a two-stage structure constituted with a front stage 20E1 and a rear stage 20E2 propagating along the optical axis as shown in FIG. 6A. In addition, the rear stage 20E2 is provided toward the optical axis to ensure that the outer surface of the front stage 20E1 and the inner surface of the rear stage 20E2 are positioned within the same plane.

The front stage 20E1 has a structure identical to the polarization separation/conversion device 20A shown in FIG. 1A except for its size. A prism 25A on the inside of the rear stage 20E2, the width of which is greater by an amount corresponding to the distance by which it is provided closer to the optical axis, i.e., double that of the prism 24. The prism 25A and a prism 26, provided on its outside, are bonded at a polarization separation film D6. On the surfaces of the prisms 25A and 26 that are opposite to the polarization separation film D6, reflective films M5 and M7 respectively are applied.

Unpolarized light L3, which has entered the prism 25A perpendicular from the area C on the front surface of the light source 10 is reflected by the reflective film M5 and is separated into transmitted s-polarized light S5 and reflected p-polarized llight P9 at the polarization separation film D6. The s-polarized light S5 is reflected by the reflective film M7 to propagate parallel to the p-polarized light P9 and passes through the polarizing conversion plate C3 to become p-polarized light P10.

The illuminance LXB and the averaged illuminance ALXB are almost identical to those in FIG. 3B except for at both ends.

In the fifth embodiment, since the generation of wasted s-polarized light S3 in the second embodiment described earlier is prevented, the light radiated from the light source 10 is utilized even more effectively.

Sixth Embodiment

Figure 7A:
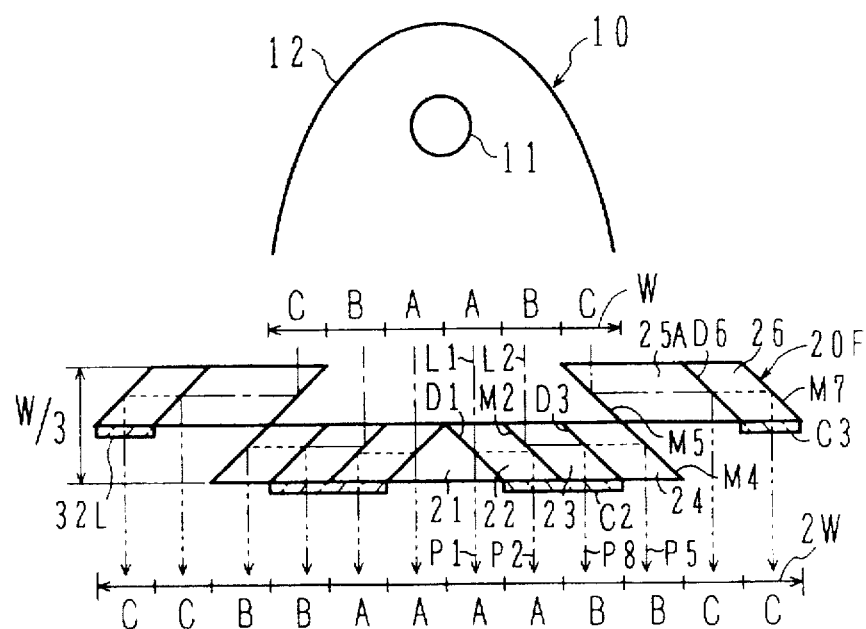
FIG. 7A is a schematic view of a polarized lighting apparatus in the sixth embodiment according to the present invention.
Figure 7B:
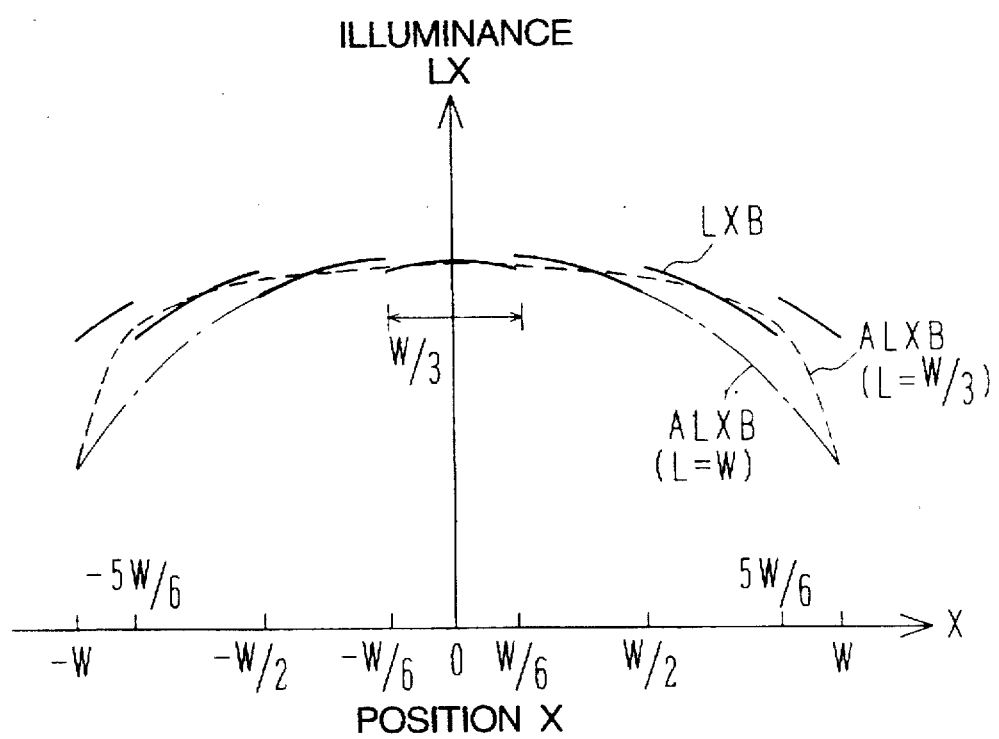
FIG. 7B is a diagrammatic view of non-averaged and averaged illuminance distribution on a emission surface of a polarization separation/conversion device.

The concept presented in FIG. 4A, which employs the reflective film M2 to replace the polarization separation film D2 positioned second from the plane of symmetry, can be applied also to the fifth embodiment. This application is shown in FIGS. 7A and 7B as the sixth embodiment.

A polarization separation/conversion device 20F features a structure in which the reflective film M2 replaces the polarization separation film D2 shown in FIG. 6A. As is obvious by comparing FIG. 7B to FIG. 6B, with this replacement, advantages similar to those achieved in the third embodiment are obtained and, moreover, in this embodiment, the distance between the steps and the magnitude of the steps are both kept to a minimum in all the embodiments with the width L reduced to approximately ⅓ of that in the first embodiment.

It goes without saying that the reflective film M2 may be replaced by an air gap.

Seventh Embodiment

Figure 8A:
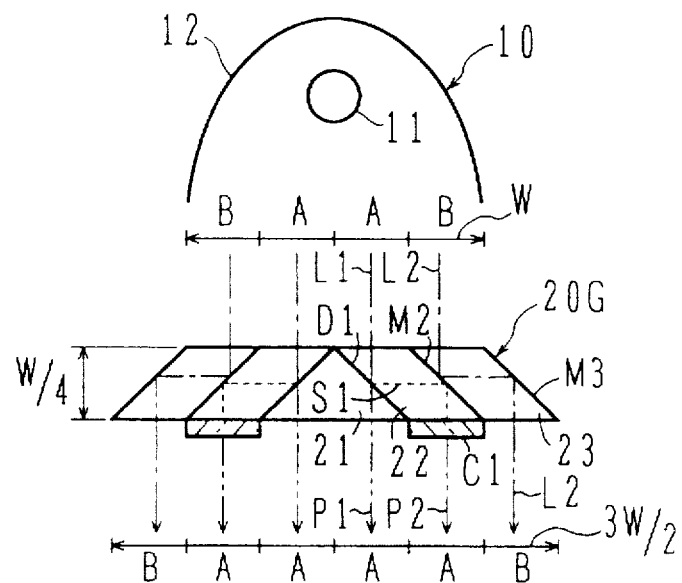
FIG. 8A is a schematic view of a polarized lighting apparatus in the seventh embodiment according to the present invention.

The concept in FIG. 4A that the reflective film M2 is employed to replace the polarization separation film D2 located second from the plane of symmetry can be also applied when constituting a polarizing separation/conversion device with fewer prisms. This application is shown in FIGS. 8A and 8B as the seventh embodiment.

While a polarization separation/conversion device 20G is provided with prisms the size of which is the same as that of the prisms in polarization separation/conversion device 20C, in the polarization separation/conversion device 20G, the prisms at both sides of the polarization separation/conversion device 20C are eliminated, and a reflective film M3 is used to replace the polarization separation film D3. In addition, a polarizing conversion plate C1, whose width is half that of the polarizing conversion plate C2, is used to achieve a simplification of the overall structure.

Figure 8B:
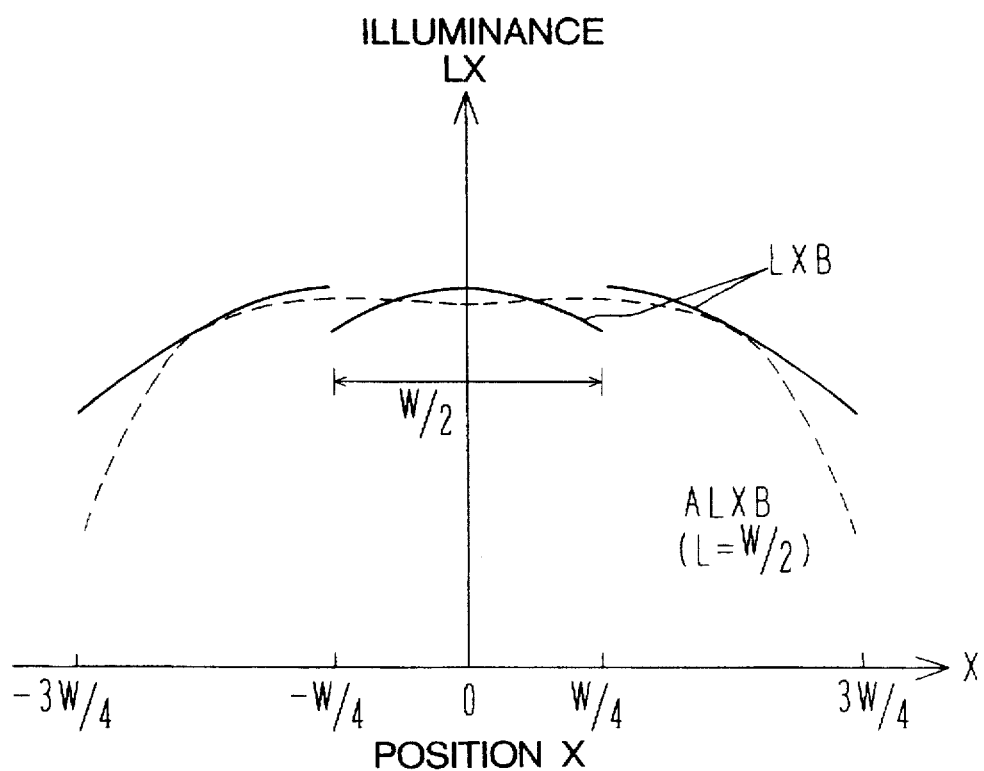
FIG. 8B is a diagrammatic view of non-averaged and averaged illuminance distribution on a emission surface of a polarization separation/conversion device.

As is obvious by comparing FIG. 8B to FIG. 4B, this embodiment achieves advantages similar to those in the third embodiment.

Unpolarized light L2 is reflected by the reflective films M2 and M3 and, while its s-polarized light component is wasted, since the intensity at both ends of the front surface of the light source 10 is relatively low, this waste is insignificant. Instead, an advantage is achieved in that the structure of the polarization separation/conversion device 20G is simplified.

Eighth Embodiment

Figure 9:
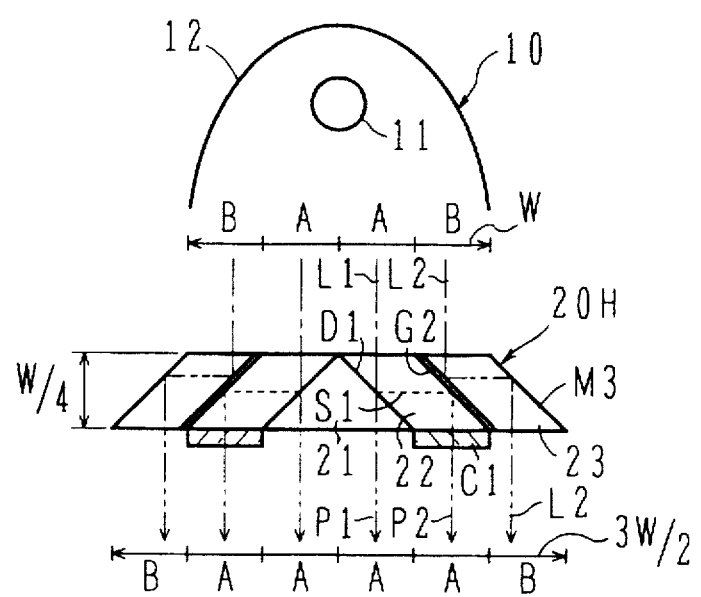
FIG. 9 is a schematic view of a polarized lighting apparatus in the eighth embodiment according to the present invention.

FIG. 9 shows the polarized lighting apparatus in the eighth embodiment. A polarization separation/conversion device 20H in this embodiment employs an air gap G2 in place of the reflective film M2 in FIG. 8A.

The advantages achieved in the eighth embodiment are identical to those achieved in the seventh embodiment described above.

Ninth Embodiment

FIG. 10 shows the polarized lighting apparatus in the ninth embodiment.

In a polarization separation/conversion device 20I in this embodiment, the prism 21, which is a triangular column in FIG. 17A, is formed as a trapezoidal column and, by increasing its width in this manner, the width of the prisms 22A, which are provided at both sides, is reduced to achieve a polarization separation/conversion device 20I that is ⅔ as thick as that in FIG. 16A.

Figure 10A:
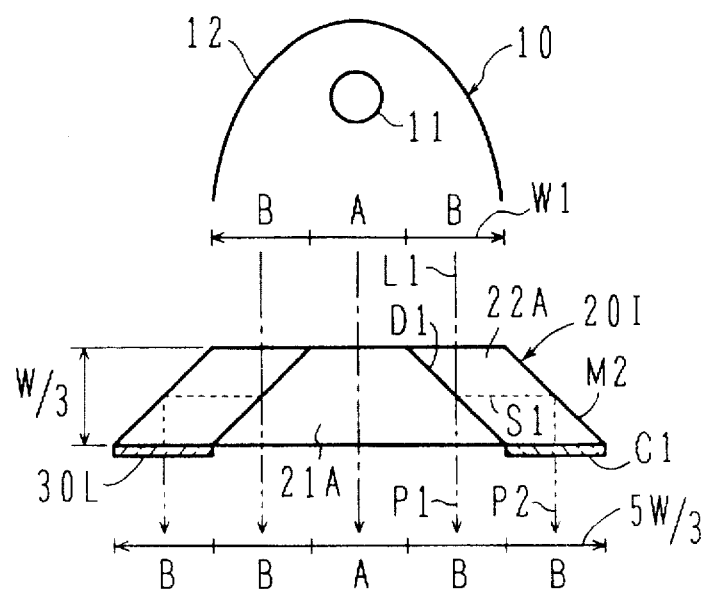
FIG. 10A s a schematic view of a polarized lighting apparatus in the ninth embodiment according to the present invention.
Figure 10B:
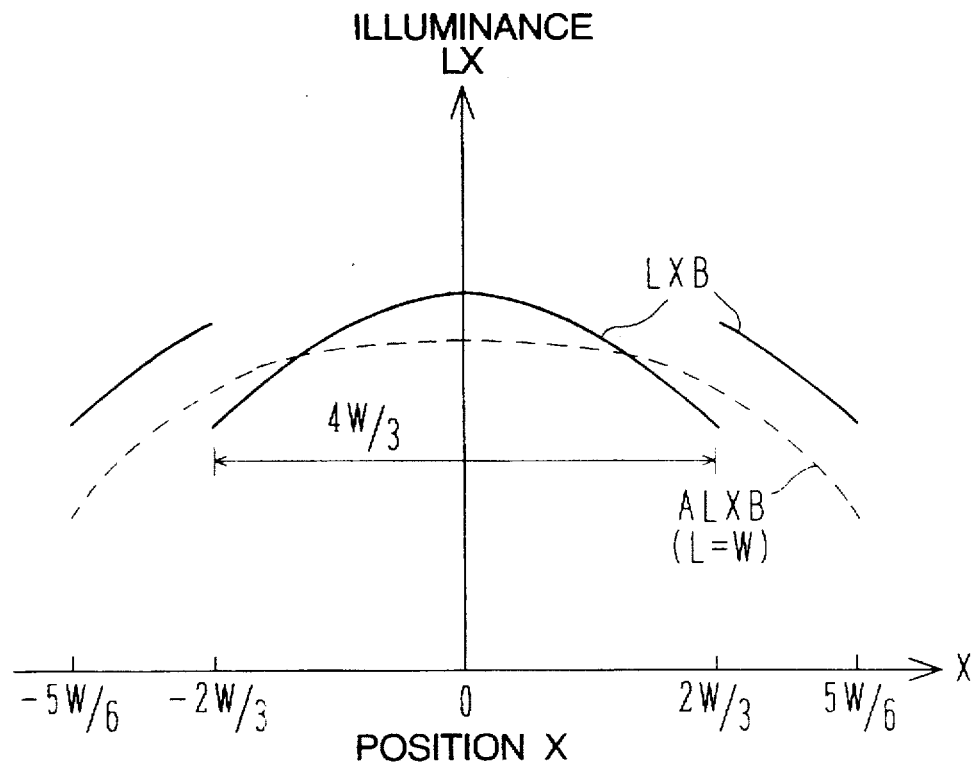
FIG. 10B is a diagrammatic view of non-averaged and averaged illuminance distribution on a emission surface of a polarization separation/conversion device.

Since light passing through the central portion of the polarization separation/conversion device 20I is not polarized, there is a waste. However, since, as shown in FIG. 10B, steps are only present at both ends, the averaged illuminance ALXB when X=L does not have the depressed area shown in FIG. 16B near the optical axis and by increasing the power of the white lamp 11, an even comfortable image is achieved.

Tenth Embodiment

Figure 11A:
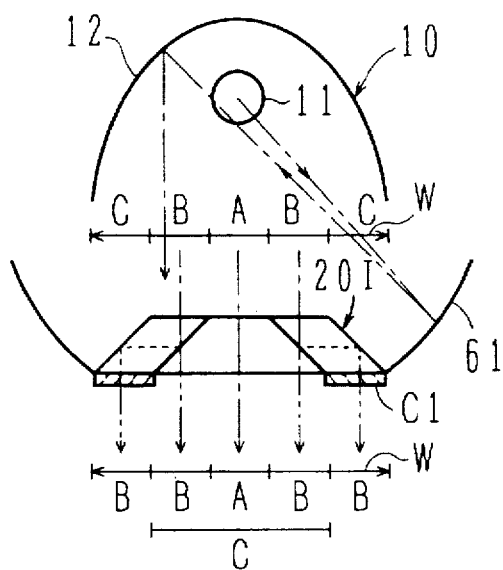
FIGS. 11A and 11B are schematic views of polarized lighting apparatus in the tenth embodiment according to the present invention.
Figure 11B:
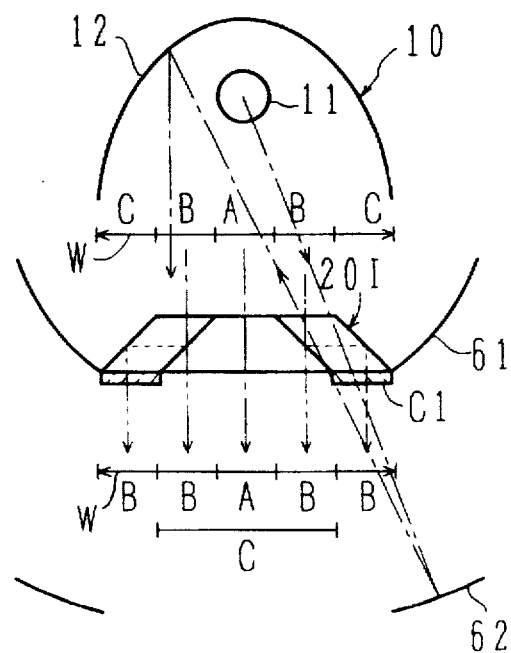

FIGS. 11A and 11B show the polarized lighting apparatus in the tenth embodiment.

The heat resistance of the optical adhesive used in the polarization separation/conversion device 20I is approximately 150° C. and, as explained earlier, the optical adhesive is degraded by ultraviolet light. Consequently, it is necessary to position the polarization separation/conversion device 20I away from the light source 10 to a degree corresponding to the power of the white lamp 11 and the air cooling capacity. Because of this, part of the light radiated from the light source 10 leaks to the outside of the polarization separation/conversion device 20I.

In order to effectively utilize this leaked light by reflecting it, a concave mirror 61, which has the same plane of symmetry as the polarization separation/conversion device 20I, is provided on the outside of the polarization separation/conversion device 20I, as shown in FIG. 11A. This concave mirror 61 may be constituted by, for instance, forming a dielectric multilayer film on to a convex surface of soda glass.

Also, as shown in FIG. 11B, he light that enters the polarizing conversion plate C1 diagonally is wasted.

In order to ensure that the linear polarized light emitted from the polarization separation/conversion device 20I is not inhibited, a concave mirror 62 which has the same plane of symmetry as the polarization separation/conversion device 20I is provided at a position that is away from the polarization separation/conversion device 20I and the optical axis.

Eleventh Embodiment

IF, in FIG. 2, the polarization separation/conversion devices 20AB, 20AR and 20AG can be provided toward the light source 10, they can be integrated into one, achieving a simplification of the structure. As for the heat resistance property, by increasing the air cooling capacity and, at the same time, increasing the infrared blocking rate, problems related to heat resistance can be solved. However, the UV & IR cut-off filter 13 in the prior art does not demonstrate a sufficient ultraviolet light blocking for polarization separation/conversion devices as explained earlier and this presents a problem.

Figure 12:
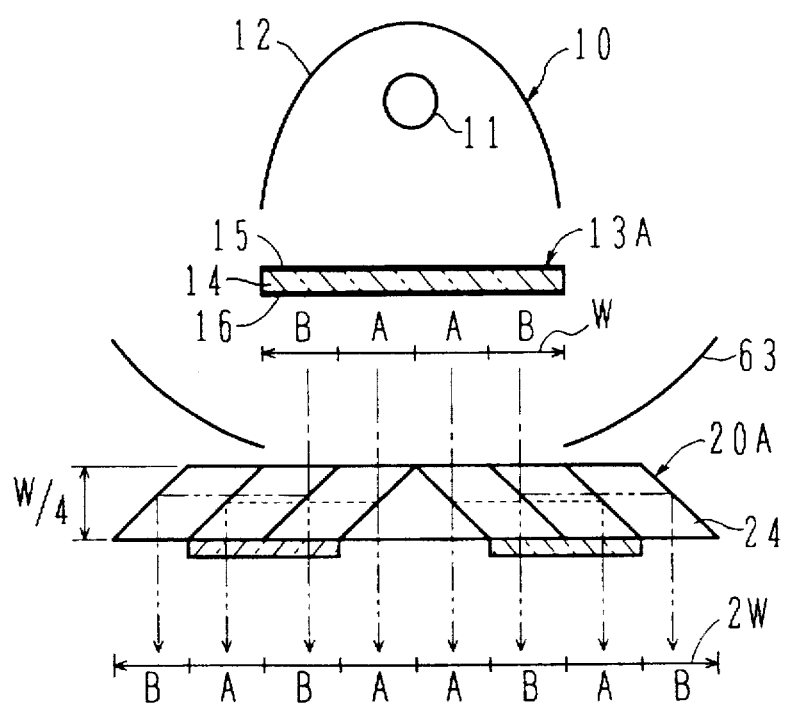
FIG. 12 is a schematic view of a polarized lighting apparatus in the eleventh embodiment according to the present invention.

FIG. 12 shows the polarized lighting apparatus in the eleventh embodiment. The polarization separation/conversion device 20A in this embodiment is structured identically to that shown in FIG. 1A. Here, a concave mirror 63 is a variation of the concave mirror 61 in FIG. 11A and the light that enters the prism 24 diagonally, which would otherwise be wasted, is redirected to the reflector 12 by the concave mirror 63.

An UV & IR cut-off filter 13A is constituted by forming an ultraviolet cut-off filter 15 on one surface of a glass plate 14 that absorbs ultraviolet light, i.e., a flint glass that contains heavy metal, for instance, and also by forming an infrared light cut-off filter 16 on the opposite surface. The ultraviolet cut-off filter 15 and the infrared light cut-off filter 16 can both be constituted with a dielectric multilayer film.

Now, while the ultraviolet light cut-off factor in an ultraviolet cutoff filter 15 that is constituted with a dielectric multilayer film cannot be increased infinitely in proportion to its thickness, there is an advantage to a glass plate 14 in that its ultraviolet light cut-off factor increases in proportion to its thickness. While the glass plate 14 absorbs ultraviolet light and generates heat, there is an advantage to a ultraviolet light cut-off filter 15 constituted with a dielectric multilayer film in that it absorbs almost no ultraviolet light.

Degradation of optical adhesive is caused by ultraviolet light whose wavelength is approximately 350 nm or lower. In order to prevent degradation of the optical adhesive, it is necessary to keep ultraviolet light in this wavelength range at $10^{-2}$ µW/cm² or less.

The intensity of such ultraviolet light will be approximately $10^3$ µW/cm² at a position 50 mm from a 250 W metal halide lamp 11 with an external diameter of 100 mm. Consequently, it is necessary to reduce ultraviolet light at wavelengths of 350 nm or less from the lamp 11 to 0.001% or less.

The transmittance of the ultraviolet light mentioned above in the ultraviolet light cut-off fitter 15 constituted with the dielectric multilayer film is approximately 1% and most of the incident ultraviolet light is reflected by the ultraviolet light cut-off filter 15. Most of the reflected ultraviolet light, in turn, is transmitted through a reflector 12, which is a concave glass covered with an dielectric multilayer film to ensure that the ultraviolet light is transmitted through it.

When SF11 (made by HOYA Co., Ltd.) with a thickness of 10 mm is used for the glass plate 14, its ultraviolet light transmittance as explained above, is 0.01%. As a result, the quantity of the harmful ultraviolet light transmitted through the UV and IR cut-off filter 13, is reduced to approximately 1/10 of the allowable quantity. In addition, since most of the ultraviolet light is blocked by the ultraviolet light cut-off filter 15, the heat generated as the glass plate 14 absorbs the ultraviolet light is made little, presenting no problem.

Thus, the shortcomings of both the ultraviolet cut-off filter and the glass plate for blocking ultraviolet light are each compensated for by the strong points of the other.

Figure 13:
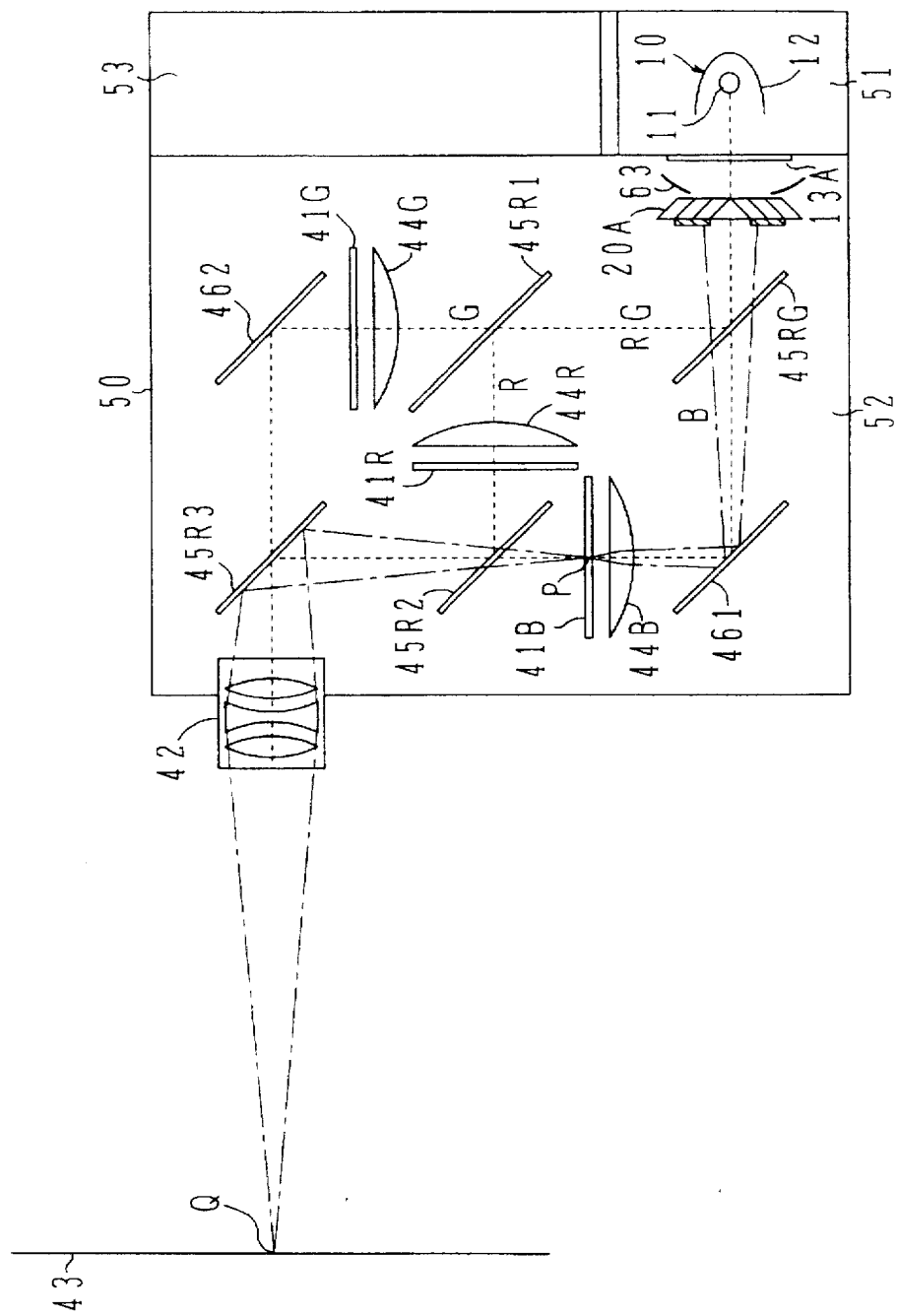
FIG. 13 is a schematic view of a projection display unit that employs the polarized lighting apparatus shown in FIG. 12.

By using this UV & IR cut-off filter 13A, it is possible to position the polarization separation/conversion device 20A close to the UV & IR cut-off filter 13A, as shown in FIG. 13. This means that only one polarization separation/conversion device 20A is required. In this sense, the improvement in the ultraviolet light cut-off factor achieved by the UV & IR cut-off filter 13A is very significant.* Although a preferred embodiments of the invention has been described in detail, it should be understood that various changes, substitutions, alterations and combinations can be made therein without departing from the spirit and scope of the invention as defined by the appended claims.

For instance, while in the embodiments explained so far, the structure of the polarization separation/conversion device is provided with a plane of symmetry that passes through the optical axis, the polarization separation/conversion device may be constituted with only one side of the plane of symmetry.

In addition since the p-polarized light and the s-polarized light are oriented relative to the polarizing separation surface, the transmission and reflection of the p-polarized light and the s-polarized light may be the reverse of those in the embodiments described above. By installing the polarizing conversion plates on the emission surface of the polarization separation/conversion device at positions opposite to those in the embodiments i.e., at position where they are not mounted in the embodiments, linear polarization may be achieved.

What is claimed is:

1. A polarization separation/conversion device comprising:

first polarization separation means for separating incident light into transmitted light having a first linear polarization state and reflected light having a second linear polarization state which is orthogonal to said first linear polarization state at a first plane;

second polarization separation means for separating incident light into transmitted light having said second linear polarization state and reflected light having said first linear polarization state at a second plane which is approximately parallel to said first plane; and polarization conversion means for converting one of said first or second linear polarization states to the other thereof;

wherein said first and second polarization separation means are arranged alternately in a row which direction is perpendicular to an optical axis of said polarization separation/conversion device, and said polarization conversion means is arranged in such a manner that light parallel to said incident light from said first and second polarization separation means includes one of said first or second linear polarization states.

2. A polarization separation/conversion device according to claim 1, further comprising:

reflection means, for reflecting incident light at a third plane which is approximately parallel to said first plane, being arranged at one side of said row of said first and second polarization separation means.

3. A polarization separation/conversion device according to claim 2, further comprising:

a plane of symmetry;

another first polarization separation means arranged symmetrically to said first polarization separation means with regard to said plane of symmetry;

another second polarization means arranged symmetrically to said second polarization separation means with regard to said plane of symmetry;

another reflection means arranged symmetrically to said reflection means with regard to said plane of symmetry; and another polarization conversion means arranged symmetrically to said polarization conversion means with regard to said plane of symmetry.

4. A polarization separation/conversion device according to claim 3, wherein each of said first and second polarization separation means includes:

a first prism;

a dielectric multilayer film formed on a surface of said first prism; and a second prism, a surface of said second prism being bonded to said dielectric multilayer film;

wherein adjacent polarization separation means share one of said first or second prism.

5. A polarization separation/conversion device according to claim 4, wherein:

one of said first or second prisms at said plane of symmetry is a first columnar prism whose cross section is an isosceles right triangle with side length of $\alpha$ and $2^{1/2}\alpha$.

any other one of said first or second prisms is a second columnar prism whose cross section is a parallelogram with an inside angle of 45° and with two side lengths of $\alpha$ and $\alpha/2^{1/2}$, and said surfaces of said first and second prism have a side of length $\alpha$.

6. A polarization separation/conversion device according to claim 5, wherein said reflection means is constructed by one of a total reflection surface of said second columnar prism or reflection film formed on a surface of said second columnar prism.

7. A polarization separation/conversion device comprising:

first polarization separation means for separating incident light into transmitted light having a first linear polarization state and reflected light having a second linear polarization state which is orthogonal to said first linear polarization state at a first plane;

second polarization separation means for separating incident light into transmitted light having said second linear polarization state and reflected light having said first linear polarization state at a second plane which is approximately parallel to said first plane;

first reflection means for reflecting incident light at a third plane which is approximately parallel to said first plane; and polarization conversion means for converting one of said first or second linear polarization states to the other thereof;

wherein said first and second polarization separation means are arranged alternately in a first row which direction is perpendicular to an optical axis of said polarization separation/conversion device, said reflection means is arranged at one side of said first row, and said first row of said first polarization separation means, said second polarization separation means and said reflection means constitute a first stage, said polarization separation/conversion device further comprising:

second reflection means for reflecting incident light at a plane which is approximately parallel to said first plane;

third polarization separation means for separating incident light into transmitted light having one of said first or second linear polarization state and reflected light having the other of said first or second linear polarization state at a plane which is approximately parallel to said first plane; and third reflection means for reflecting incident light at a plane which is approximately parallel to said first plane;

wherein said second reflection means, said third polarization separation means and said third reflection means are arranged in this order in a second row which direction is parallel to said first row, and said second row of said second and third reflection means and said third polarization separation means constitute a second stage, said first and second stage is arranged in such a manner that incident light parallel to said optical axis comes to said second reflection means without coming to said polarization separation means adjacent to said first reflection means of said first stage, and said polarization conversion means is attained in such a manner that light from said first and second stage includes one of said first or second linear polarization states.

8. A polarization separation/conversion device comprising:

first and second polarization separation means each for separating incident light into transmitted light having a first linear polarization state and reflected light having a second linear polarization state which is orthogonal to said first linear polarization state at a separation plane;

first reflection means for reflecting said reflected light received from said first polarization means and for reflecting unpolarized incident light;

second reflection means for reflecting incident light at a plane which is approximately parallel to said separation plane of said first and second polarization separation means;

polarization conversion means for converting one of said first or second linear polarization states to the other thereof; and wherein said first polarization separation means, said first reflection means, said second polarization separation means and said second reflection means are arranged in this order in a row which direction is perpendicular to an optical axis of said polarization separation/conversion device, said polarization conversion means is arranged in such a manner that light parallel to said incident light from said first and second polarization separation means and said first and second reflection means includes one of said first or second linear polarization states.

9. A polarization separation/conversion device according to claim 8, further comprising:
- a plane of symmetry;
- another first polarization separation means arranged symmetrically to said first polarization separation means with regard to said plane of symmetry;
- another second polarization means arranged symmetrically to said second polarization separation means with regard to said plane of symmetry;
- another first reflection means arranged symmetrically to said first reflection means with regard to said plane of symmetry;
- another second reflection means arranged symmetrically to said second reflection means with regard to said plane of symmetry; and
- another polarization conversion means arranged symmetrically to said polarization conversion means with regard to said plane of symmetry.

10. A polarization separation/conversion device according to claim 9, wherein each of said first and second polarization separation means includes:
- a first prism;
- a dielectric multilayer film formed on a surface of said first prism; and
- a second prism, a surface of said second prism being bonded to said dielectric multilayer film.

11. A polarization separation/conversion device according to claim 10, wherein:
- one of said first or second prisms at said plane of symmetry is a first columnar prism whose cross section is an isosceles right triangle with side length of $\alpha$ and $2^{1/2}\alpha$, and
- any other one of said first or second prisms is a second columnar prism whose cross section is a parallelogram with an inside angle of 45° and with two side lengths of $\alpha$ and $\alpha/2^{1/2}$, and
- said surfaces of said first and second prism have a side of length $\alpha$.

12. A polarization separation/conversion device according to claim 11, wherein each of said first reflection means is constructed by one of a total reflection surface of said second columnar prism or reflection film formed on a surface of said second columnar prism and each of said second reflection means is constructed by one of a total reflection surface of said second columnar prism or reflection film formed on a surface of said second columnar prism.

13. A polarization separation/conversion device comprising:
- first polarization separation means for separating incident light into transmitted light having a first linear polarization state and reflected light having a second linear polarization state which is orthogonal to said first linear polarization state at a separation plane;
- second polarization separation means for separating incident light into transmitted light having one of said first or second linear polarization state and reflected light having the other of said first or second linear polarization state at a plane which is approximately parallel to said separation plane;
- third polarization separation means for separating incident light into transmitted light having one of said first or second linear polarization state and reflected light having the other of said first or second linear polarization state at a plane which is approximately parallel to said separation plane;
- first through fourth reflection means each for reflecting incident light at a plane which is approximately parallel to said separation plane; and
- polarization conversion means for converting one of said first or second linear polarization states to the other thereof;
- wherein said first polarization separation means, said first reflection means, said second polarization separation means and said second reflection means are arranged in this order in a first row which direction is perpendicular to an optical axis of said polarization separation/conversion device, and said first row of said first and second polarization separation means and said first and second reflection means constitute a first stage,
- said third reflection means, said third polarization separation means and said fourth reflection means are arranged in this order in a second row which direction is parallel to said first row, and said second row of said third and fourth reflection means and said third polarization separation means constitute a second stage,
- said first and second stage is arranged in such a manner that incident light parallel to said optical axis comes to said third reflection means without coming to said polarization separation means adjacent to said second reflection means of said first stage, and
- said polarization conversion means is arranged in such a manner that light from said first and second stage includes one of said first or second linear polarization states.

14. A polarization separation/conversion device comprising:
- polarization separation means for separating incident light into transmitted light having a first linear polarization state and reflected light having a second linear polarization state which is orthogonal to said first linear polarization state at a separation plane;
- first reflection means for reflecting said reflected light received from said polarization separation means and for reflecting unpolarized incident light;
- second reflection means for reflecting incident light at a plane which is approximately parallel to said separation plane; and
- polarization conversion means for converting one of said first or second linear polarization states to the other thereof;
- wherein said polarization separation means, said first reflection means and said second reflection means are arranged in this order in a row which direction is perpendicular to an optical axis of said polarization separation/conversion device, and
- said polarization conversion means is arranged in such a manner that light parallel to said incident light from said polarization separation means and said first and second reflection means includes one of said first or second linear polarization states.

15. A polarization separation/conversion device according to claim 14, further comprising:
- a plane of symmetry;
- another polarization separation means arranged symmetrically to said polarization separation means with regard to said plane of symmetry;
- another first reflection means arranged symmetrically to said first reflection means with regard to said plane of symmetry;
- another second reflection means arranged symmetrically to said second reflection means with regard to said plane of symmetry; and another polarization conversion means arranged symmetrically to said polarization conversion means with regard to said plane of symmetry.

16. A polarization separation/conversion device comprising:
   a first columnar prism whose cross section has a trapezoid with a length α of diagonal sides facing opposite each other and with an inside angle of approximately 45°;
   second and third columnar prisms each of whose cross section has a parallelogram with lengths of approximately α and α/2$^{1/2}$ and with an inside angle of approximately 45°; and
   a first dielectric multilayer film formed between a first diagonal surface of said first columnar prism and a first surface of said second columnar prism, said first diagonal surface having a shape approximately identical to a shape of said first surface of said second columnar prism, said first dielectric multilayer film separating incident light into transmitted light having a first linear polarization state and reflected light having a second linear polarization state which is orthogonal to said first linear polarization state;
   a second dielectric multilayer film formed between a second diagonal surface of said first columnar prism and a first surface of said third columnar prism, said second diagonal surface having a shape approximately identical to said first surface of said third columnar prism, said second dielectric multilayer film separating incident light into transmitted light having said first linear polarization state and reflected light having said second linear polarization state;
   first reflection means formed on a second surface opposite to said first surface of said second columnar prism;
   second reflection means formed on a second surface opposite to said first surface of said third columnar prism; and
   polarization conversion means for converting one of said first or second linear polarization state to the other thereof,
   said polarization conversion means being arranged in such a manner that light parallel to said incident light from said first and second dielectric multilayer film and from said first and second reflection means includes one of said first or second linear polarization state;
   said polarization separation/conversion device is constructed symmetrically in regard to a plane of symmetry of said first columnar prism, said plane of symmetry including a longitudinal cross section.

17. A polarized lighting apparatus comprising:
   a light source for supplying unpolarized light; and
   a polarization separation/conversion device receiving said unpolarized light and including
      first polarization separation means for separating incident light into transmitted light having a first linear polarization state and reflected light having a second linear polarization state which is orthogonal to said first linear polarization state at a first plane;
      second polarization separation means for separating incident light into transmitted light having said second linear polarization state and reflected light having said first linear polarization state at a second plane which is approximately parallel to said first plane; and
      polarization conversion means for converting one of said first or second linear polarization states to the other thereof;
   wherein said first and second polarization separation means are arranged alternately in a row which direction is perpendicular to an optical axis of said polarization separation/conversion device, and
   said polarization conversion means is arranged in such a manner that light parallel to said incident light from said first and second polarization separation means includes one of said first or second linear polarization states.

18. A polarized lighting apparatus comprising:
   a light source for supplying unpolarized light; and
   a polarization separation/conversion device receiving said unpolarized light and including
      first and second polarization separation means each for separating incident light into transmitted light having a first linear polarization state and reflected light having a second linear polarization state which is orthogonal to said first linear polarization state at a separation plane;
      first reflection means for reflecting said reflected light received form said first polarization separation means and for reflecting said unpolarized light from said light source;
      second reflection means for reflecting incident light at a plane which is approximately parallel to said separation plane of said first and second polarization separation means;
      polarization conversion means for converting one of said first or second linear polarization states to the other thereof; and
   wherein said first polarization separation means, said first reflection means, said second polarization separation means and said second reflection means are arranged in this order in a row which direction is perpendicular to an optical axis of said polarization separation/conversion device,
   said polarization conversion means is arranged in such a manner that light parallel to said incident light form said first and second polarization separation means and said first and second reflection means includes one of said first or second linear polarization states.

19. A polarized lighting apparatus comprising:
   a light source for supplying unpolarized light; and
   a polarization separation/conversion device receiving said unpolarized light and including
      polarization separating means for separating incident light into transmitted light having a first linear polarization state and reflected light having a second linear polarization state which is orthogonal to said first linear polarization state at a separation plane;
      first reflection means for reflecting said reflected light received from said first polarization separation means and for reflecting said unpolarized light form said light source;
      second reflection means each for reflecting incident light at a plane which is approximately parallel to said separation plane; and
      polarization conversion means for converting one of said first or second linear polarization states to the other thereof;
   wherein said polarization separation means, said first reflection means and said second reflection means are arranged in this order in a row which direction is perpendicular to an optical axis of said polarization separation/conversion device, and
   said polarization conversion means is arranged in such a manner that light parallel to said incident light form said polarization separation means and said first and second reflection means includes one of said first or second linear polarization states.

20. A projection display unit comprising:

a light source;

a polarization separation/conversion device into which incident light from said light source is entered, said polarization separation/conversion device including:
first polarization separation means for separating incident light into transmitted light having a first linear polarization state and reflected light having a second linear polarization state which is orthogonal to said first linear polarization state at a first plane;

second polarization separation means for separating incident light into transmitted light having said second linear polarization state and reflected light having said first linear polarization state at a second plane which is approximately parallel to said first plane; and polarization conversion means for converting one of said first or second linear polarization states to the other thereof;

wherein said first and second polarization separation means are arranged alternately in a row which direction is perpendicular to an optical axis of said polarization separation/conversion device, and said polarization conversion means is arranged in such a manner that light parallel to said incident light from said first and second polarization separation means includes one of said first or second linear polarization states;

a light valve for clanging linear polarized light transmittance in response to an image input signal, light from said polarization separation/conversion device being entered into said light valve; and a projecting lens for projecting light from said light valve on to a screen.

21. A projection display unit comprising:

a light source;

a polarization separation/conversion device into which incident light from said light source is entered, said polarization separation/conversion device including:
first and second polarization separation means each for separating incident light into transmitted light having a first linear polarization state and reflected light having a second linear polarization state which is orthogonal to said first linear polarization state at a separation plane;

first and second reflection means, each for reflecting incident light at a plane which is approximately parallel to said separation plane of said first and second polarization separation means;

polarization conversion means for converting one of said first or second linear polarization states to the other thereof; and wherein said first polarization separation means, said first reflection means, said second polarization separation means and said second reflection means are arranged in this order in a row which direction is perpendicular to an optical axis of said polarization separation/conversion device, said polarization conversion means is arranged in such a manner that light parallel to said incident light from said first and second polarization separation means and said fisrt and second reflection means includes one of said first or second linear polarization states;

a light valve for changing linear polarized light transmittance in response to an image input signal, light form said polarization separation/conversion device being entered into said light valve; and a projecting lens for projecting light from said light valve on to a screen.

22. A projection display unit comprising:

a light source;

a polarization separation/conversion device into which incident light from said light source is entered, said polarization separation/conversion device including:
polarization separation means for separating incident light into transmitted light having a first linear polarization state and reflected light having a second linear polarization state which is orthogonal to said first linear polarization state at a separation plane;

first and second reflection means each for reflecting incident light at a plane which is approximately parallel to said separation plane; and polarization conversion means for converting one of said first or second linear polarization states to the other thereof;

wherein said polarization separation means, said first reflection means and said second reflection means are arranged in this order in a row which direction is perpendicular to an optical axis of said polarization separation/conversion device, and said polarization conversion means is arranged in such a manner that light parallel to said incident light form said polarization separation means and said first and second reflection means includes one of said first or second linear polarization states;

a light valve for changing linear polarized light transmittance in response to an image input signal, light form said polarization separation/conversion device being entered into said light valve; and a projecting lens for projecting light from said light valve on to a screen.

23. A projection display unit comprising:

a light source;

a polarization separation/conversion device for separating incident light from said light source into first light having a first linear polarization state and second light having a second linear polarization state which is orthogonal to said first linear polarization state and for converting said second light into said first linear polarization state;

a UV & IR cut-off filter arranged in a light path between said light source and said polarization separation/conversion device, said UV & IR cut-off filter including a glass plate containing a substance that absorbs ultraviolet light in wavelengths of approximately 350 nm or less, an ultraviolet cut-off filter, constituted by forming a dielectric multilayer film on a surface of said glass plate, being arranged to said light source side, and an infrared cut-off filter constituted by forming a dielectric multilayer film on a surface of said glass plate opposite to said surface on which said ultraviolet cut-off filter is formed, wherein said glass plate has a thickness that allows for said glass plate to have an ultraviolet light cut-off factor greater than that of said ultraviolet cut-off filter;

a light valve for changing linear polarized light transmittance in response to an image input signal, light form said polarization separation/conversion device being entered into said light valve; and a projecting lens for projecting light from said light valve on to a screen.

* * * * *

UNITED STATES PATENT AND TRADEMARK OFFICE
CERTIFICATE OF CORRECTION

PATENT NO. : 5,764,412
DATED : June 9, 1998
INVENTOR(S) : Suzuki et al.

It is certified that error appears in the above-identified patent and that said Letters Patent is hereby corrected as shown below:

On the title page,

Under "[57] Abstract", line 6, delete "films" and insert --film-- therefor

Under "[57] Abstract", line 15, delete "20" and insert --20A-- therefor

Column 1, line 11, delete "lquid" and insert --liquid-- therefor

Column 1, line 13, before "10" insert --it-- therefor

Column 1, line 20, delete "Linear" and insert --linear-- therefor

UNITED STATES PATENT AND TRADEMARK OFFICE
CERTIFICATE OF CORRECTION

PATENT NO. : 5,764,412
DATED : June 9, 1998
INVENTOR(S) : Suzuki et al.

It is certified that error appears in the above-identified patent and that said Letters Patent is hereby corrected as shown below:

Column 1, line 56, delete "light." and insert

--light,-- therefor

Column 4, line 7, delete "Or" and insert

--of-- therefor

Column 4, line 26, delete "or" and insert

--of-- therefor

Column 5, line 54, delete "First" and insert

--first-- therefor

Column 6, line 22, delete "In" and insert

--in-- therefor

UNITED STATES PATENT AND TRADEMARK OFFICE
CERTIFICATE OF CORRECTION

PATENT NO. : 5,764,412
DATED : June 9, 1998
INVENTOR(S) : Suzuki et al.

Page 3 of 7

It is certified that error appears in the above-identified patent and that said Letters Patent is hereby corrected as shown below:

Column 7, line 57, delete "First" and insert --first-- therefor

Column 8, line 23, delete "First" and insert --first-- therefor

Column 8, line 54, delete "cutoff" and insert --cut-off-- therefor

Column 8, line 58, delete "overcomes" and insert --overcome-- therefor

Column 9, line 48, delete "s" and insert --is-- therefor

UNITED STATES PATENT AND TRADEMARK OFFICE
CERTIFICATE OF CORRECTION

PATENT NO. : 5,764,412
DATED : June 9, 1998
INVENTOR(S) : Suzuki et al.

It is certified that error appears in the above-identified patent and that said Letters Patent is hereby corrected as shown below:

Column 10, line 62, delete "reflected in" and insert --reflected. In-- therefor

Column 12, line 39, delete "1s" and insert --is-- therefor

Column 13, line 40, delete "Light" and insert --light-- therefor

Column 14, line 23, delete "polarized" and insert --p-polarized-- therefor

Column 14, line 30, delete "With" and insert --with-- therefor

Column 14, line 46, delete "Of" and insert --of-- therefor

UNITED STATES PATENT AND TRADEMARK OFFICE
CERTIFICATE OF CORRECTION

PATENT NO. : 5,764,412
DATED : June 9, 1998
INVENTOR(S) : Suzuki et al.

It is certified that error appears in the above-identified patent and that said Letters Patent is hereby corrected as shown below:

Column 14, line 49, delete "Film" and insert --film-- therefor

Column 15, line 38, delete "1light" and insert --light-- therefor

Column 15, line 56, delete "2OF" and insert --20F-- therefor

Column 17, line 17, delete "IF" and insert --If-- therefor

Column 17, line 64, delete "fitter" and insert --filter-- therefor

Column 20, line 35, delete "attained" and insert --arranged-- therefor

UNITED STATES PATENT AND TRADEMARK OFFICE
CERTIFICATE OF CORRECTION

PATENT NO. : 5,764,412
DATED : June 9, 1998
INVENTOR(S) : Suzuki et al.

It is certified that error appears in the above-identified patent and that said Letters Patent is hereby corrected as shown below:

Column 24, line 17, delete "form" and insert --from-- therefor

Column 24, line 35, delete "form" and insert --from-- therefor

Column 24, line 64, delete "form" and insert --from-- therefor

Column 25, line 29, delete "clanging" and insert --changing-- therefor

Column 25, line 65, delete "form" and insert --from-- therefor

Column 26, line 25, delete "form" and insert --from-- therefor

UNITED STATES PATENT AND TRADEMARK OFFICE
CERTIFICATE OF CORRECTION

PATENT NO. : 5,764,412
DATED : June 9, 1998
INVENTOR(S) : Suzuki et al.

It is certified that error appears in the above-identified patent and that said Letters Patent is hereby corrected as shown below:

Column 26, line 30, delete "form" and insert

--from-- therefor

Column 26, line 61, delete "form" and insert

--from-- therefor

Signed and Sealed this

Sixth Day of October, 1998

*Attest:*

BRUCE LEHMAN

*Attesting Officer*   Commissioner of Patents and Trademarks